(12) United States Patent
Edge et al.

(10) Patent No.: US 10,383,081 B2
(45) Date of Patent: Aug. 13, 2019

(54) METHODS AND SYSTEMS FOR POSITIONING OF A MOBILE DEVICE USING BROADCAST OF ASSISTANCE DATA

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/897,088

(22) Filed: Feb. 14, 2018

(65) Prior Publication Data

US 2018/0324740 A1 Nov. 8, 2018

Related U.S. Application Data

(60) Provisional application No. 62/588,306, filed on Nov. 17, 2017, provisional application No. 62/547,703, (Continued)

(51) Int. Cl.
| | |
|---|---|
| *H04W 64/00* | (2009.01) |
| *H04W 8/02* | (2009.01) |
| *G01S 19/05* | (2010.01) |
| *H04W 12/02* | (2009.01) |

(Continued)

(52) U.S. Cl.
CPC .......... *H04W 64/00* (2013.01); *G01S 5/0236* (2013.01); *G01S 19/05* (2013.01); *H04W 8/02* (2013.01);
(Continued)

(58) Field of Classification Search
CPC ......... G01S 19/05; H04L 12/18; H04L 63/12; H04L 9/0637; H04W 12/02; H04W 12/04; H04W 12/06; H04W 4/02; H04W 64/00
See application file for complete search history.

(56) References Cited

U.S. PATENT DOCUMENTS

| | | | | |
|---|---|---|---|---|
| 2004/0087315 A1* | 5/2004 | Dufva | ................. | H04Q 3/0029 455/456.1 |
| 2008/0113671 A1* | 5/2008 | Ghozati | ................. | H04L 45/00 455/456.1 |

(Continued)

OTHER PUBLICATIONS

International Search Report and Written Opinion—PCT/US2018/030747—ISA/EPO—dated Jul. 24, 2018.

*Primary Examiner* — Nizar N Sivji
(74) *Attorney, Agent, or Firm* — Hunter Clark PLLC

(57) ABSTRACT

Disclosed are methods and systems for broadcasting positioning assistance data (PAD) to subscriber devices in a wireless network. In one aspect, a location server may encode and optionally cipher PAD and transfer the encoded and optionally ciphered PAD to a base station for broadcast in a system information block (SIB) in at least one cell. In an aspect, the PAD may be segmented by the location server or by the base station with each PAD segment broadcast in a separate SIB. Cipher key information for ciphered PAD may be transferred by the location server to a network node and provided to a subscriber device using a mobility management procedure. A subscriber device may receive, optionally decipher and decode PAD in SIBs broadcast by a base station and may use the PAD to assist location of the subscriber device.

42 Claims, 14 Drawing Sheets

Related U.S. Application Data filed on Aug. 18, 2017, provisional application No. 62/544,677, filed on Aug. 11, 2017, provisional application No. 62/502,642, filed on May 6, 2017, provisional application No. 62/502,593, filed on May 5, 2017.

(51) Int. Cl.
   *G01S 5/02* (2010.01)
   *H04W 84/04* (2009.01)
   *H04W 12/04* (2009.01)
   *H04W 92/04* (2009.01)

(52) U.S. Cl.
   CPC ............ *H04W 12/02* (2013.01); *H04W 12/04* (2013.01); *H04W 84/042* (2013.01); *H04W 92/045* (2013.01)

(56) References Cited

U.S. PATENT DOCUMENTS

| | | | | |
|---|---|---|---|---|
| 2009/0253422 A1* | 10/2009 | Fischer | ................ | H04W 48/08 455/418 |
| 2012/0106740 A1* | 5/2012 | Kehren | ................ | H04W 12/04 380/270 |
| 2013/0223626 A1* | 8/2013 | Edge | ................ | H04W 4/06 380/270 |
| 2013/0237247 A1* | 9/2013 | Lee | ................ | G01S 5/06 455/456.1 |
| 2017/0123072 A1* | 5/2017 | Miya | ................ | G01S 19/25 |
| 2017/0317894 A1* | 11/2017 | Dao | ................ | H04W 28/24 |

* cited by examiner

METHODS AND SYSTEMS FOR POSITIONING OF A MOBILE DEVICE USING BROADCAST OF ASSISTANCE DATA

CROSS-REFERENCE TO RELATED APPLICATIONS

This application claims the benefit of U.S. Provisional Application Nos. 62/502,593, entitled "METHOD AND/OR SYSTEM FOR POSITIONING OF A MOBILE DEVICE USING BROADCAST OF ASSISTANCE DATA," filed May 5, 2017, 62/502,642, entitled "METHOD AND/OR SYSTEM FOR POSITIONING OF A MOBILE DEVICE USING BROADCAST OF ASSISTANCE DATA," filed May 6, 2017, 62/544,677, entitled "METHOD AND/OR SYSTEM FOR POSITIONING OF A MOBILE DEVICE USING BROADCAST OF ASSISTANCE DATA," filed Aug. 11, 2017, 62/547,703, entitled "METHOD AND/OR SYSTEM FOR POSITIONING OF A MOBILE DEVICE USING BROADCAST OF ASSISTANCE DATA," filed Aug. 18, 2017 and 62/588,306 entitled "METHOD AND/OR SYSTEM FOR POSITIONING OF A MOBILE DEVICE USING BROADCAST OF ASSISTANCE DATA," filed Nov. 17, 2017, which are assigned to the assignee thereof and which are expressly incorporated herein by reference in their entirety.

BACKGROUND

Field

Subject matter disclosed herein relates to estimation of a location of a mobile device and more particularly to broadcast of positioning assistance data to help enable location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. Alternatively, a mobile device may compute an estimate of its location using OTDOA techniques. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

Assistance data to a mobile device to assist in acquiring and measuring signals and/or in computing a location estimate from the measurements may be useful not only for GNSS location but also for OTDOA and other position methods such as GNSS based Real Time Kinematics (RTK). However, sending assistance data individually to each mobile device may result in significant delay and/or consume significant resources in a network and/or mobile device including battery use in a mobile device to interact with a network. Therefore, broadcast of assistance data to many or all mobile devices may be preferred in some implementations.

SUMMARY

Particular embodiments are directed to a method at a user equipment (UE), comprising: receiving first ciphering key parameters from a network node in a network; receiving a System Information Block (SIB) periodically broadcast from a base station within at least one cell for the base station, the SIB comprising ciphered and encoded first positioning assistance data for the least one cell for the base station, and an indication of ciphering; deciphering the encoded first positioning assistance data based on the first ciphering key parameters and the indication of ciphering; decoding the deciphered and encoded first positioning assistance data; and obtaining location information for the UE based, at least in part, on the deciphered and decoded first positioning assistance data.

Another particular implementation is directed to a user equipment (UE) for using broadcast location assistance data in a network, comprising: a wireless transceiver; and one or more processors configured to: obtain first ciphering key parameters received at the wireless transceiver from a network node in a network; obtain a System Information Block (SIB) periodically broadcast from a base station within at least one cell for the base station received at the wireless transceiver, the SIB comprising ciphered and encoded first positioning assistance data for the least one cell for the base station, and an indication of ciphering; decipher the encoded first positioning assistance data based on the first ciphering key parameters and the indication of ciphering; decode the deciphered and encoded first positioning assistance data; and obtain location information for the UE based, at least in part, on the deciphered and decoded first positioning assistance data.

Another particular implementation is directed to a storage medium comprising computer readable instructions stored thereon which are executable by one or more processors at a user equipment (UE) to: obtain ciphering key parameters received at the UE from a network node in a network; obtain a System Information Block (SIB) periodically broadcast from a base station within at least one cell for the base station received at the UE, the SIB comprising ciphered and encoded positioning assistance data for the least one cell for the base station, and an indication of ciphering; decipher the encoded positioning assistance data based on the ciphering key parameters and the indication of ciphering; decode the deciphered and encoded positioning assistance data; and obtain location information for the UE based, at least in part, on the deciphered and decoded positioning assistance data.

Another particular implementation is directed to a user equipment (UE) for using broadcast location assistance data in a network, comprising: means for receiving first ciphering key parameters from a network node in a network; means for receiving a System Information Block (SIB) periodically broadcast from a base station within at least one cell for the base station, the SIB comprising ciphered and encoded first positioning assistance data for the least one cell for the base station, and an indication of ciphering; means for deciphering the encoded first positioning assistance data based on the first ciphering key parameters and the indication of ciphering; means for decoding the deciphered and encoded first positioning assistance data; and means for obtaining location information for the UE based, at least in part, on the deciphered and decoded first positioning assistance data.

Another particular implementation is directed to a method at a location server for broadcasting positioning assistance data in a network, comprising: obtaining location parameters for at least one cell in the network; determining the positioning assistance data based, at least in part, on the location parameters; encoding the positioning assistance data for transmission in a System Information Block (SIB) for the at least one cell; and sending the encoded positioning assistance data to a base station for the at least one cell, wherein the base station periodically broadcasts the SIB within the at least one cell, wherein the SIB comprises the encoded positioning assistance data.

Another particular implementation is directed to a location server for broadcasting positioning assistance data in a network, comprising: a communication interface; and one or more processors configured to: obtain location parameters for at least one cell in the network; determine the positioning assistance data based, at least in part, on the location parameters; encode the positioning assistance data for transmission in a System Information Block (SIB) for the at least one cell; and initiate transmission of the encoded positioning assistance data through the communication interface to a base station for the at least one cell, wherein the base station periodically broadcasts the SIB within the at least one cell, wherein the SIB comprises the encoded positioning assistance data.

Another particular implementation is directed to a storage medium comprising computer readable instructions stored thereon which are executable by one or more processors of a location server to: obtain location parameters for at least one cell in the network; determine the positioning assistance data based, at least in part, on the location parameters; encode the positioning assistance data for transmission in a System Information Block (SIB) for the at least one cell; and initiate transmission of the encoded positioning assistance data to a base station for the at least one cell, wherein the base station periodically broadcasts the SIB within the at least one cell, wherein the SIB comprises the encoded positioning assistance data.

Another particular implementation is directed to a location server for broadcasting positioning assistance data in a network, comprising: means for obtaining location parameters for at least one cell in the network; means for determining the positioning assistance data based, at least in part, on the location parameters; means for encoding the positioning assistance data for transmission in a System Information Block (SIB) for the at least one cell; and means for sending the encoded positioning assistance data to a base station for the at least one cell, wherein the base station periodically broadcasts the SIB within the at least one cell, wherein the SIB comprises the encoded positioning assistance data.

Another particular implementation is directed to a method at a base station for broadcasting positioning assistance data in a network, comprising: receiving a first message from a location server, the first message comprising first positioning assistance data encoded for transmission in a System Information Block (SIB) for at least one cell for the base station; and periodically broadcasting the SIB within the at least one cell, the SIB comprising the encoded first positioning assistance data.

Another particular implementation is directed to a base station for broadcasting location assistance data in a network, comprising: a wireless transceiver device; and one or more processors configured to: obtain a first message received from a location server, the first message comprising first positioning assistance data encoded for transmission in a System Information Block (SIB) for at least one cell for the base station; and periodically broadcast the SIB through the wireless transceiver device within the at least one cell, the SIB comprising the encoded first positioning assistance data.

Another particular implementation is directed a storage medium comprising computer readable instructions stored thereon which are executable by one or more processors at a base station to: obtain a first message received at the base station from a location server, the first message comprising first positioning assistance data encoded for transmission in a System Information Block (SIB) for at least one cell for the base station; and periodically broadcast from the base station the SIB within the at least one cell, the SIB comprising the encoded first positioning assistance data.

Another particular implementation is directed to a base station for broadcasting positioning assistance data in a network, comprising: means for receiving a first message from a location server, the first message comprising first positioning assistance data encoded for transmission in a System Information Block (SIB) for at least one cell for the base station; and means for periodically broadcasting the SIB within the at least one cell, the SIB comprising the encoded first positioning assistance data.

Another particular implementation is directed to a method at a network node for broadcasting positioning assistance data in a network, comprising: receiving ciphering key parameters from a location server, the ciphering key parameters descriptive of ciphering of the positioning assistance data in a System Information Block (SIB); and sending the ciphering key parameters to at least one user equipment (UE) using a mobility management procedure.

Another particular implementation is directed to a network node for broadcasting positioning assistance data in a network, comprising: a communication interface; and one or more processors configured to: obtain ciphering key parameters received at the communication interface from a location server, the ciphering key parameters descriptive of ciphering of the positioning assistance data in a System Information Block (SIB); and initiate transmission of the ciphering key parameters through the communication interface to at least one user equipment (UE) using a mobility management procedure.

Another particular implementation is directed to a storage medium comprising computer readable instructions stored thereon which are executable by one or more processors of a network node to: obtain ciphering key parameters received at the network node from a location server, the ciphering key parameters descriptive of ciphering of the positioning assistance data in a System Information Block (SIB); and initiate transmission of the ciphering key parameters to at least one user equipment (UE) using a mobility management procedure.

Another particular implementation is directed to a network node for broadcasting positioning assistance data in a network, comprising: means for receiving ciphering key parameters from a location server, the ciphering key parameters descriptive of ciphering of the positioning assistance data in a System Information Block (SIB); and means for sending the ciphering key parameters to at least one user equipment (UE) using a mobility management procedure.

It should be understood that the aforementioned implementations are merely example implementations, and that claimed subject matter is not necessarily limited to any particular aspect of these example implementations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
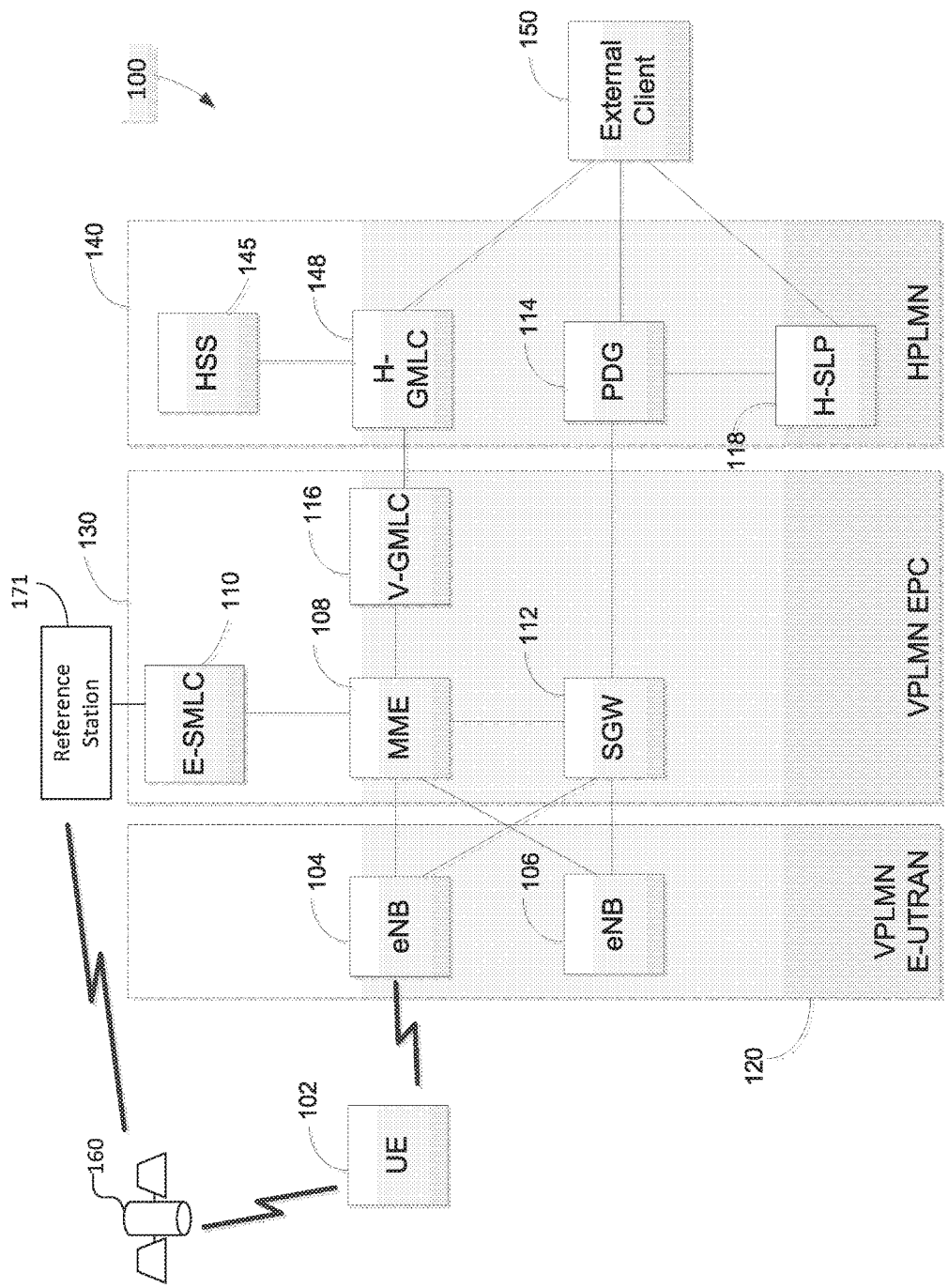
FIG. 1A is a system diagram illustrating certain features of a communication system comprising a mobile device and a cellular network, in accordance with an example implementation.

Reference is made in the following detailed description to accompanying drawings, which form a part hereof, wherein like numeric and alphanumeric labels may designate like parts throughout that are identical, similar and/or analogous. In addition, multiple instances of an element may be indicated by following a first number for the element with a hyphen and a second number. For example, multiple instances of an element 111 may be indicated as 111-1, 111-2, 111-3 etc. When referring to such an element using only the first number, any instance of the element is to be understood (e.g. element 111 in the previous example would refer any of to elements 111-1, 111-2 and 111-3).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

To support positioning of a mobile device, two broad classes of location solution have been defined: control plane and user plane. With control plane (CP) location, signaling related to positioning and support of positioning may be carried over existing network (and mobile device) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for mobile devices that use radio access according to Global System for Mobile communications GSM (2G), Universal Mobile Telecommunications System (UMTS) (3G) and LTE (4G). A control plane solution for future Fifth Generation (5G) wireless access may be defined in future. These solutions are defined in 3GPP Technical Specifications (TSs) 23.271 (common part), 43.059 (GSM access), 25.305 (UMTS access) and 36.305 (LTE access). The Open Mobile Alliance (OMA) has similarly defined a UP location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE, e.g. for the GNSS, OTDOA and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using OTDOA).

In an alternative UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using OTDOA).

In another standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from data broadcast by GPS and GNSS satellites themselves) as well as sensors.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE access, in which case LPP or LPP/LPPe messages are exchanged between a UE and E-SMLC. LPP or LPPe messages may be exchanged between a UE and E-SMLC via a serving Mobility Management Entity (MME) and a serving eNodeB for the UE. LPP and LPP/LPPe may also be used to help support the OMA SUPL solution for many types of wireless access that support IP messaging (such as LTE and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message An LS and a base station (e.g. an eNodeB for LTE access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNodeB and an LS that is an E-SMLC.

FIG. 1A is a diagram illustrating a communication system 100 for location support of a user equipment (UE) 102 that supports and is currently using Long Term Evolution (LTE) radio access (also referred to as wideband LTE) or Narrow Band Internet of Things (NB-IoT) radio access (also referred to as narrowband LTE), where NB-IoT and LTE may be as defined by 3GPP—e.g. in 3GPP TS 36.300. The communication system 100 may be referred to as an Evolved Packet System (EPS). As illustrated, the communication system 100 may include the UE 102, an Evolved Universal Mobile Telecommunications Service (UMTS) Terrestrial Radio Access Network (E-UTRAN) 120, and an Evolved Packet Core (EPC) 130. The E-UTRAN 120 and the EPC 130 may be part of a Visited Public Land Mobile Network (VPLMN) that is a serving network for the UE 102 and communicates with a Home Public Land Mobile Network (HPLMN) 140 for the UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the communication system 100 provides packet-switched services to the UE 102. However, as those skilled in the art will readily appreciate, the various concepts presented throughout this disclosure may be extended to networks providing circuit-switched services.

The UE 102 may comprise any electronic device configured for NB-IoT and/or LTE radio access, for example. The UE 102 may be referred to as a device, a wireless device, a mobile terminal, a terminal, a mobile station (MS), a mobile device, a SET, or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), 5G, WiMax, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi or Bluetooth® (BT). UE 102 may also support communication with one or more types of wireline network such as by using a Digital Subscriber Line (DSL) or packet cable for example. Although FIG. 1A shows only one UE 102, there may be many other UEs that can each correspond to UE 102.

The UE 102 may enter a connected state with a wireless communication network that may include the E-UTRAN 120. In one example, UE 102 may communicate with a cellular communication network by transmitting wireless signals to, and/or receiving wireless signals from, a cellular transceiver, such as an evolved Node B (eNodeB or eNB) 104 in the E-UTRAN 120. The E-UTRAN 120 may include one or more additional eNBs 106. The eNB 104 provides user plane and control plane protocol terminations toward the UE 102. The eNB 104 may comprise a serving eNB for UE 102 and may also be referred to as a base station, a base transceiver station, a radio base station, a radio transceiver, a radio network controller, a transceiver function, a base station subsystem (BSS), an extended service set (ESS), or by some other suitable terminology. The UE 102 also may transmit wireless signals to, or receive wireless signals from, a local transceiver (not shown in FIG. 1A), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication include NB-IoT and LTE, but may further include GSM, CDMA, WCDMA, HRPD, eMTC and future Fifth Generation (5G) radio types. NB-IoT, GSM, WCDMA, LTE, eMTC and 5G are technologies defined by (or expected to be defined by) 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 may be connected by an interface (e.g. the 3GPP S1 interface) to the VPLMN EPC 130. The EPC 130 includes a Mobility Management Entity (MME) 108, and a Serving Gateway (SGW) 112 through which data (e.g. Internet Protocol (IP) packets) to and from the UE 102 may be transferred. The MME 108 may be the serving MME for UE 102 and is then the control node that processes the signaling between the UE 102 and the EPC 130 and supports attachment and network connection of UE 102, mobility of UE 102 (e.g. via handover between network cells) as well as establishing and releasing data bearers on behalf of the UE 102. Generally, the MME 108 provides bearer and connection management for the UE 102 and may be connected to the SGW 112, the eNBs 104 and 106, an Enhanced Serving Mobile Location Center (E-SMLC) 110 and a Visited Gateway Mobile Location Center (V-GMLC) 116 in the VPLMN EPC 130.

The E-SMLC 110 may support location of the UE 102 using the 3GPP control plane (CP) location solution defined in 3GPP technical specifications (TSs) 23.271 and 36.305. The V-GMLC 116, which may also be referred to simply as a Gateway Mobile Location Center (GMLC) 116, may provide access on behalf of an external client (e.g. external client 150) or another network (e.g. HPLMN 140) to the location of UE 102. The external client 150 may comprise a web server or remote application that may have some association with UE 102 (e.g. may be accessed by a user of UE 102 via VPLMN E-UTRAN 120, VPLMN EPC 130 and HPLMN 140) or may be a server, application or computer system providing a location service to some other user or users which may include obtaining and providing the location of UE 102 (e.g. to enable a service such as friend or relative finder, asset tracking or child or pet location).

E-SMLC 110 may be connected to or have access to one or more reference stations 171 which may be part of VPLMN EPC 130 or separate from VPLMN EPC 130 (e.g. part of a GNSS reference network and owned and operated by a service provider different to the operator of VPLMN EPC 130). A reference station 171 may comprise or include a GNSS receiver configured to acquire, measure and decode signals transmitted by one or more GNSSs. A reference station 171 may be configured to obtain or determine orbital and timing data for Satellite Vehicles (SVs) for one or more GNSSs and infer information for environmental factors that can affect GNSS location such as ionospheric and tropospheric delay. A reference station 171 may transfer determined information to E-SMLC 110—e.g. periodically or whenever the determined information changes.

As illustrated, the HPLMN 140 includes a Home Gateway Mobile Location Center (H-GMLC) 148 that may be connected to the V-GMLC 116 (e.g. via the Internet), as well as a Packet Data Network Gateway (PDG) 114 that may be connected to the SGW 112 (e.g. via the Internet). The PDG 114 may provide UE 102 with Internet Protocol (IP) address allocation and IP and other data access to external networks (e.g. the Internet) and to external clients (e.g. external client 150) and external servers, as well as other data transfer related functions. In some cases, PDG 114 may be located in VPLMN EPC 130 and not in HPLMN 140 when the UE 102 receives local IP breakout. The PDG 114 may be connected to a location server, such as H-SLP 118. The H-SLP 118 may support the SUPL UP location solution defined by OMA and may support location services for UE 102 based on subscription information for UE 102 stored in H-SLP 118. In some embodiments of communication system 100, a Discovered SLP (D-SLP) or Emergency SLP (E-SLP) (not shown in FIG. 1A), in or accessible from VPLMN EPC 130, may be used to locate UE 102 using the SUPL UP solution.

The H-GMLC 148 may be connected to a Home Subscriber Server (HSS) 145 for UE 102, which is a central database that contains user-related and subscription-related information for UE 102. The H-GMLC 148 may provide location access to the UE 102 on behalf of external clients such as external client 150. One or more of the H-GMLC 148, PDG 114, and H-SLP 118 may be connected to the external client 150, e.g., through another network, such as the Internet. In some cases, a Requesting GMLC (R-GMLC) located in another PLMN (not shown in FIG. 1A) may be connected to H-GMLC 148 (e.g. via the Internet) in order to provide location access to UE 102 on behalf of external clients connected to the R-GMLC. The R-GMLC, H-GMLC 148 and V-GMLC 116 may support location access to the UE 102 using the 3GPP CP solution defined in 3GPP TS 23.271.

It should be understood that while a VPLMN network (comprising VPLMN E-UTRAN 120 and VPLMN EPC 130) and a separate HPLMN 140 are illustrated in FIG. 1A; both PLMNs (networks) may be the same PLMN. In that case, (i) the H-SLP 118, PDG 114, and HSS 145, may be in the same network (EPC) as the MME 108, and (ii) the V-GMLC 116 and the H-GMLC 148 may comprise the same GMLC.

In particular implementations, the UE 102 may have circuitry and processing resources capable of obtaining location related measurements (also referred to as location measurements), such as measurements for signals received from GPS or other Satellite Positioning System (SPS) SVs 160, measurements for cellular transceivers such as eNBs 104 and 106, and/or measurements for local transceivers. UE 102 may further have circuitry and processing resources capable of computing a position fix or estimated location of UE 102 based on these location related measurements. In some implementations, location related measurements obtained by UE 102 may be transferred to a location server, such as the E-SMLC 110 or H-SLP 118, after which the location server may estimate or determine a location for UE 102 based on the measurements.

Location related measurements obtained by UE 102 may include measurements of signals received from SVs 160 that are part of an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers). UE 102 or a separate location server (e.g. E-SMLC 110 or H-SLP 118) may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WiFi, or combinations thereof. In some of these techniques (e.g. A-GNSS, AFLT and OTDOA), pseudoranges or timing differences may be measured by UE 102 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 102. Here, location servers, such as E-SMLC 110 or H-SLP 118, may be capable of providing positioning assistance data to UE 102 including, for example, information regarding signals to be measured by UE 102 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, OTDOA and ECID. The facilitation may include improving signal acquisition and measurement accuracy by UE 102 and/or, in some cases, enabling UE 102 to compute its estimated location based on the location measurements. For example, a location server may comprise an almanac (e.g., a Base Station Almanac (BSA)) which indicates the locations and identities of cellular transceivers and transmitters (e.g. eNBs 104 and 106) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 102 may obtain measurements of signal strength (e.g. received signal strength indication (RSSI) or reference signal received power (RSRP)) for signals received from cellular transceivers (e.g., eNBs 104, 106) and/or local transceivers and/or may obtain a signal to noise ratio (S/N), a reference signal received quality (RSRQ), or a round trip signal propagation time (RTT) between UE 102 and a cellular transceiver (e.g., eNB 104 or 106) or a local transceiver. A UE 102 may transfer these measurements to a location server, such as E-SMLC 110 or H-SLP 118, to determine a location for UE 102, or in some implementations, UE 102 may use these measurements together with positioning assistance data (e.g. terrestrial almanac data or GNSS SV data such as GNSS Almanac and/or GNSS Ephemeris information) received from the location server to determine a location for UE 102.

In the case of OTDOA, UE 102 may measure a Reference Signal Time Difference (RSTD) between signals, such as a Position Reference Signal (PRS) or Cell Specific Reference Signal (CRS), received from nearby transceivers or base stations (e.g. eNBs 104 and 106). An RSTD measurement may provide the time of arrival difference between signals (e.g. CRS or PRS) received at UE 102 from two different transceivers (e.g. an RSTD between signals received from eNB 104 and from eNB 106). The UE 102 may return the measured RSTDs to a location server (e.g. E-SMLC 110 or H-SLP 118) which may compute an estimated location for UE 102 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 102 may be referred to as a location, location estimate, location fix, fix, position, position estimate or position fix, and may be geodetic, thereby providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which the UE 102 is expected to be located with some given or default probability or confidence level (e.g., 67% or 95%). A location of a UE 102 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 102 or by another entity such as eNB 104) that are used to determine (e.g. calculate) a location estimate for UE 102 may be referred to as measurements, location measurements, location related measurements, positioning measurements or position measurements and the act of determining a location for the UE 102 may be referred to as positioning of the UE 102 or locating the UE 102.

According to an embodiment, communication system 100 may be configured to deliver positioning assistance data in downlink broadcast messages to UE devices such as UE 102. For example, positioning assistance data may be broadcasted in system information blocks (SIBs) in downlink messages from eNB devices 104 and 106. Furthermore, positioning assistance data that is broadcasted in the SIBs may be key encrypted (also referred to as being ciphered). UE 102 may receive one or more cipher keys in messages other than the broadcast messages for use in decrypting the broadcasted positioning assistance data.

Figure 1B:
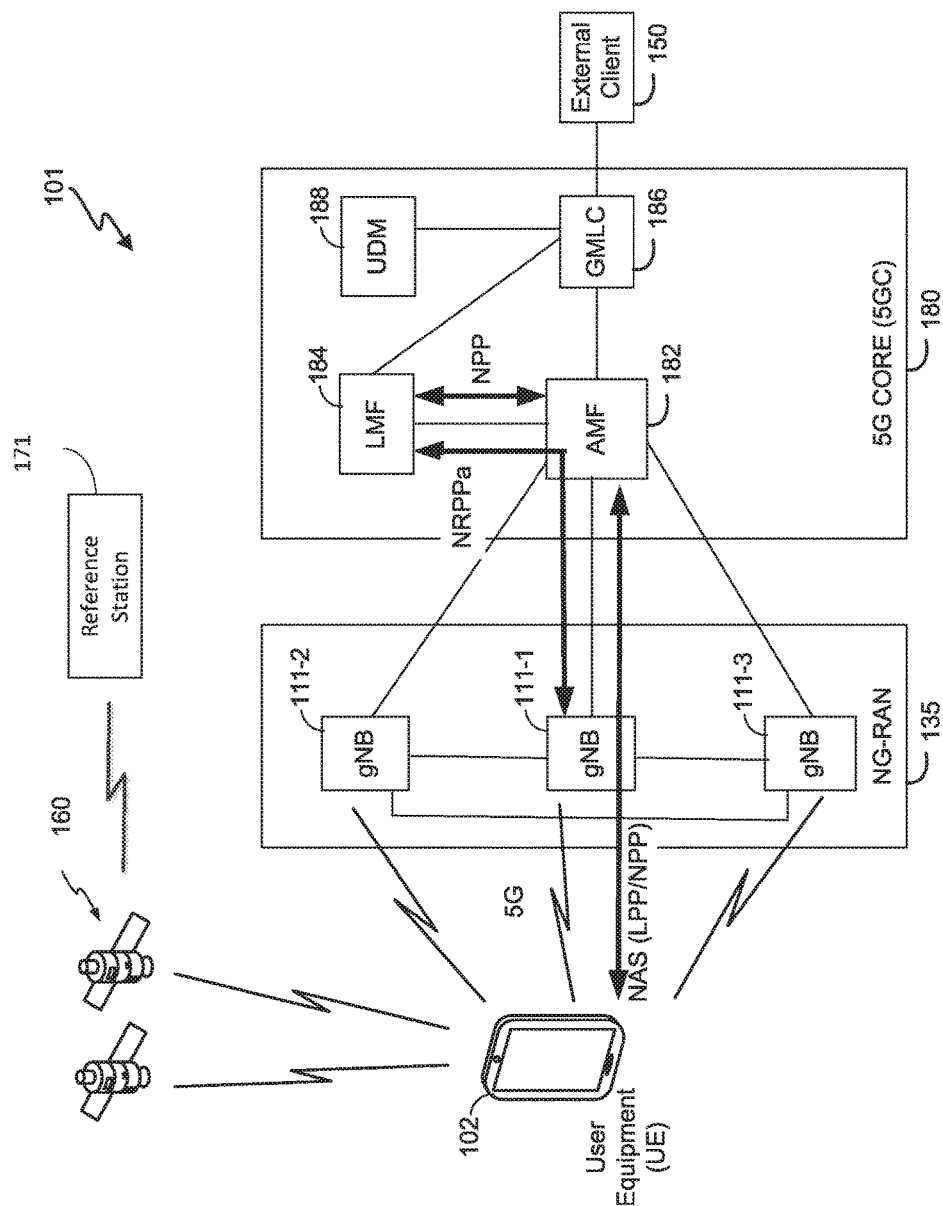
FIG. 1B is a system diagram illustrating certain features of a communication system comprising a mobile device and a cellular network, in accordance with an alternative example implementation.

FIG. 1B shows a diagram of a communication system 101, according to an alternative embodiment to the embodiment of communication system 100 described above with reference to FIG. 1A. In communication system 101, UE 102, reference station(s) 171, SVs 160 and external client 150 may operate in connection with Fifth Generation (5G) features of communication system 101. According to an embodiment, communication system 101 may be configured to deliver positioning assistance data in downlink broadcast messages to UE devices such as UE 102. For example, positioning assistance data may be broadcasted in system information blocks (SIBs) in downlink messages from gNB devices 111. Furthermore, positioning assistance data that is broadcasted in the SIBs may be key encrypted. UE 102 may receive one or more cipher keys in messages other than the broadcast messages for use in decrypting the broadcasted positioning assistance data.

The communication system 101 may be configured to implement broadcast of assistance data from base stations. Here, the communication system 101 comprises a UE 102, and components of a Fifth Generation (5G) network comprising a Next Generation Radio Access Network (NG-RAN) 135 and a 5G Core Network (5GC) 180. A 5G network may also be referred to as a New Radio (NR) network; NG-RAN 135 may be referred to as an NR Radio Access Network (RAN) or as a 5G RAN; and 5GC 180 may be referred to as an NG Core network (NGC). Standardization of an NG-RAN and 5GC is ongoing in 3GPP. Accordingly, NG-RAN 135 and 5GC 180 may conform to current or future standards for 5G support from 3GPP. In this context, a "3GPP New Radio" means a base station configured to implement portions of a 5G or NR service or a 5G or NR compatible service. The communication system 101 may further utilize information from SVs 160 for a Global Navigation Satellite System (GNSS) like GPS, GLONASS, Galileo or Beidou. Additional components of the communication system 101 are described below. The communication system 101 may include additional or alternative components.

It should be noted that FIG. 1B provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 101. Similarly, the communication system 101 may include a larger or smaller number of SVs 160, gNBs 111, external clients 150, and/or other components. The illustrated connections that connect the various components in the communication system 101 include data and signaling connections which may include additional (intermediary) components, direct or indirect physical and/or wireless connections, and/or additional networks. Furthermore, components may be rearranged, combined, separated, substituted, and/or omitted, depending on desired functionality.

Base stations (BSs) in the NG-RAN 135 shown in FIG. 1B comprise NR Node Bs, also referred to as gNBs, 111-1, 111-2 and 111-3 (collectively and generically referred to herein as gNBs 111). Pairs of gNBs 111 in NG-RAN 135 may be connected to one another—e.g. directly as shown in FIG. 1B or indirectly via other gNBs 111. Access to the 5G network is provided to UE 102 via wireless communication between the UE 102 and one or more of the gNBs 111, which may provide wireless communications access to the 5GC 180 on behalf of the UE 102 using 5G. In FIG. 1B, the serving gNB for UE 102 is assumed to be gNB 111-1, although other gNBs (e.g. gNB 111-2 and/or gNB 111-3) may act as a serving gNB if UE 102 moves to another location or may act as a secondary gNB to provide additional throughout and bandwidth to UE 102. Some gNBs 111 in FIG. 1B (e.g. gNB 111-2 or gNB 111-3) may be configured to function as positioning-only beacons which may transmit signals (e.g. PRS signals) and/or broadcast assistance data to assist positioning of UE 102 but may not receive signals from UE 102 or from other UEs.

In some implementations, NG-RAN 135 may include one or more next generation eNBs (ng-eNBs, not shown in FIG. 1B) which may provide LTE radio access to UE 102 and connectivity of UE 102 to elements in 5GC 180 (e.g. AMF 182) and/or to external client 150. An ng-eNB in NG-RAN 135 may be connected to one or more other ng-eNBs in NG-RAN 135, to one or more gNBs 111 and/or to AMF 182.

As noted, while FIG. 1B depicts nodes configured to communicate according to 5G communication protocols, nodes configured to communicate according to other communication protocols, such as, for example, LTE protocol, may be used. Such nodes, configured to communicate using different protocols, may be controlled, at least in part, by the 5GC 180. Thus, the NG-RAN 135 may include any combination of gNBs, eNBs, ng-eNBs, or other types of base stations or access points.

The gNBs 111 may communicate with an Access Management Function (AMF) 182, which, for positioning functionality, communicates with a Location Management Function (LMF) 184. The AMF 182 may support mobility of the UE 102, including cell change and handover and may participate in supporting a signaling connection to the UE 102 and possibly data and voice bearers for the UE 102. The LMF 184 may support positioning of the UE 102 when UE accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of departure (AOD), and other position methods. The LMF 184 may also process location services requests for the UE 102, e.g., received from the AMF 182 or from the GMLC 186. In some embodiments, a node/system that implements the LMF 184 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The Gateway Mobile Location Center (GMLC) 186 may support a location request for the UE 102 received from an external client 150 and may forward such a location request to the AMF 182 for forwarding by the AMF 182 to the LMF 184 or may forward the location request directly to the LMF 184. A location response from the LMF 184 (e.g. containing a location estimate for the UE 102) may be similarly returned to the GMLC 186 either directly or via the AMF 182, and the GMLC 186 may then return the location response (e.g., containing the location estimate) to the external client 150. The GMLC 186 is shown connected to both the AMF 182 and LMF 184 but only one of these connections may be supported by 5GC 180 in some implementations. Unified Data Management (UDM) 188 may store subscription data for UE 102 in the case that 5GC 180 is part of an HPLMN for UE 102 and may perform similar functions to HSS 145 in communication system 100.

As further illustrated in FIG. 1B, the LMF 184 and the gNBs 111 may communicate using a New Radio Position Protocol A (which may be referred to as NPPa or NRPPa) which may be the same as, similar to, or an extension of the LTE Positioning Protocol A (LPPa) defined in 3GPP Technical Specification (TS) 36.455, with NRPPa messages being transferred between the gNBs 111 and the LMF 184 via the AMF 182. As further illustrated in FIG. 1B, LMF 184 and UE 102 may communicate using LPP and/or a New Radio Positioning Protocol (which may be referred to as NPP or NRPP) which may be the same as, similar to, or an extension of LPP, where the LPP and/or NPP messages are transferred between the UE 102 and the LMF 184 via the AMF 182 and a serving gNB 111-1 for UE 102. For example, LPP and/or NPP messages may be transferred between the LMF 184 and the AMF 182 using a 5G Location Services Application Protocol (LCS AP) and may be transferred between the AMF 182 and the UE 102 using a 5G Non-Access Stratum (NAS) protocol. The LPP and/or NPP protocol may be used to support positioning of UE 102 using UE assisted and/or UE based position methods such as A-GNSS, RTK, OTDOA and/or ECID. The NRPPa protocol may be used to support positioning of UE 102 using network based position methods such as ECID (when used with measurements obtained by a gNB 111) and/or may be used by LMF 184 to obtain location related information from gNBs 111 such as parameters defining PRS transmission from gNBs 111.

When NG-RAN 135 includes one or more ng-eNBs, an ng-eNB in NG-RAN 135 may communicate with LMF 184 using NRPPa and/or may enable transfer of LPP and/or NPP messages between UE 102 and LMF 184 via the ng-eNB and AMF 182. An ng-eNB in NG-RAN 135 may also broadcast positioning assistance data to UEs such as UE 102.

Information provided by the gNBs 111 (or by ng-eNBs in NG-RAN 135) to the LMF 184 using NRPPa may include timing and configuration information for PRS transmission and location coordinates of the gNBs 111 (or the ng-eNBs). The LMF 184 can then provide some or all of this information to the UE 102 as assistance data in an LPP and/or NPP message via the NG-RAN 135 and the 5GC 180.

An LPP and/or NPP message sent from the LMF 184 to the UE 102 may instruct the UE 102 to do any of a variety of things, depending on desired functionality. For example, an LPP and/or NPP message could contain an instruction for the UE 102 to obtain measurements for GNSS (or A-GNSS), wireless LAN, and/or OTDOA (or some other position method). In the case of OTDOA, the LPP and/or NPP message may instruct the UE 102 to obtain one or more measurements (e.g. Reference Signal Time Difference (RSTD) measurements) of PRS signals transmitted within particular cells supported by particular gNBs 111 (or supported by some other type of base station). The UE 102 may send the measurements back to the LMF 184 in an LPP and/or NPP message (e.g. inside a 5G NAS message) via the serving gNB 111-1 and the AMF 182.

In embodiments, LMF 184 may encode location assistance data and optionally cipher the encoded location assistance data and send the encoded and optionally ciphered location assistance data to a gNB 111 or an ng-eNB (e.g. using NRPPa) for broadcast to UEs 102.

It is noted that the description below and illustrations in FIGS. 2-9 of broadcast of positioning assistance data is mostly directed to the example communication system 100 of FIG. 1A. However, the description and illustration should be understood to apply also to the example communication system 101 of FIG. 1B. In such a case, references below to E-UTRAN 120, EPC 130, eNB 104, eNB 106, MME 108, E-SMLC 110, V-GMLC 116 and LPPa may be replaced, respectively, by references to NG-RAN 135, 5GC 180, gNB 111-1 (or an ng-eNB in NG-RAN 135), gNB 111-2 (or gNB 111-3 or an ng-eNB in NG-RAN 135), AMF 182, LMF 184, GMLC 186 and NRPPa.

Figure 2:
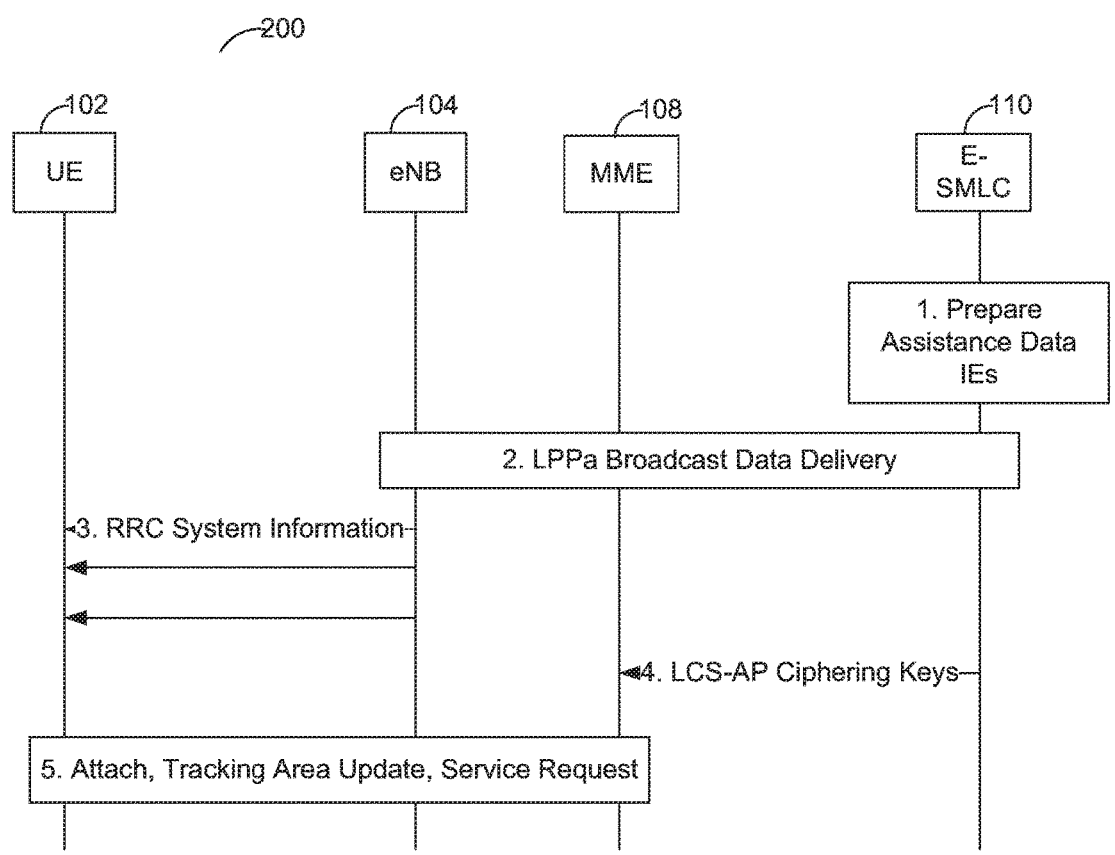
FIGS. 2, 3A-3D, 4 and 5 are signaling flow diagrams showing broadcast of positioning assistance data according to various embodiments.

FIG. 2 shows an example signaling flow 200 for broadcasting positioning assistance data using LTE as in communication system 100. At stage 1 in signaling flow 200, the various assistance data elements for each supported positioning method are collected, processed and formatted at the E-SMLC 110. For example, the E-SMLC 110 may gather data (e.g. for GNSS, RTK and/or OTDOA) from reference station 171 and/or other sources (e.g. eNB 104, eNB 106, Operations and Maintenance). The E-SMLC 110 may then encode and potentially cipher System Information Block (SIB) content. For example, the ciphering may use the 128-bit Advanced Encryption Standard (AES) algorithm defined by the National Institute of Standards and Technology (NIST) in the United States. For example, AES counter mode may be used.

At stage 2, the assistance data information is provided to the eNB 104 (e.g. via MME 108) and to other eNBs such as eNB 106 using LPPa procedures, as discussed below.

At stage 3, the eNB 104 includes the received assistance data in System Information Block (SIB) Messages which may be for a Radio Resource Control (RRC) protocol for LTE access as defined in 3GPP TS 36.331. The assistance data are broadcast (or broadcasted) by the eNB 104 (and by other eNBs such as eNB 106) using System Information Blocks (SIBs), The UE 102 may apply a system information acquisition procedure (e.g. defined in 3GPP TS 36.331) to acquire the assistance data information that is broadcasted.

In some implementations, a SIB containing positioning AD may be segmented by E-SMLC 110 or by eNB 104 prior to broadcast if the overall size of the SIB exceeds a maximum System Information (SI) message size (e.g. as defined for RRC in 3GPP TS 36.331). Segmentation may involve fragmenting a SIB into a sequence of two or more SIB segments which are each broadcast in a separate SI message as described further down.

At stage 4, the E-SMLC 110 provides the ciphering keys being used to MME 108 and other MMEs. For example, the ciphering keys may be provided at stage 4 using a Location Services Application Protocol (LCS-AP) message. Information that is provided for each key at stage 4 may include an identification of applicable SIBs, a key value, a key identifier and a time of key applicability.

At stage 5, the MME 108 distributes the keys to suitably subscribed UEs (e.g. UE 102) using a NAS mobility management procedure (e.g. as defined in 3GPP TS 23.401) such as an Attach, Tracking Area Update and/or a Service Request. Alternatively, a Supplementary Services procedures could be used to distribute the keys (e.g., a Mobile Originated Located Request (MO-LR)). The keys may be used by a UE (e.g. UE 102) to decipher the assistance data in a SIB broadcast at stage 3 when ciphering is used.

A possible SIB definition for broadcast of assistance data may be as shown in Table 1, where GNSS Navigation Model assistance data (AD) is used as an example. The definition in Table 1 is based on use of Abstract Syntax Notation One (ASN.1) and may be employed to precisely define SIB content for broadcast AD—e.g. in 3GPP TS 36.331 or 3GPP TS 36.355. The subscripts "-r15" in Table 1 may not be considered part of a parameter name and may be included only to indicate a 3GPP release in which a parameter was first defined (e.g. Release 15).

TABLE 1

```
-- ASN1START
    SystemInformationBlockTypeXX-r15   ::=   SEQUENCE {
    cipheringKeyData-r15                     CipheringKeyData-r15
    OPTIONAL,
    assistanceDataSegmentType-r15            ENUMERATED {notLastSegment,
                                             lastSegment},
    assistanceDataSegmentNumber-r15          INTEGER (0..63),
    gnss-NavigationModel-r15                 OCTET STRING,
    lateNonCriticalExtension                 OCTET STRING   OPTIONAL
}
-- ASN1STOP
```

In Table 1, the cipheringKeyData Information Element (IE), if present, may indicate whether the gnss-NavigationModel IE octet string is ciphered. The assistanceDataSegmentType IE may Indicate whether segmentation is used and may indicate whether the included gnss-NavigationModel SIB segment is the last SIB segment or not. The assistanceDataSegmentNumber IE may provide a segment number for the gnss-NavigationModel segment contained in the SIB. A segment number of zero may correspond to the first segment, a segment number of one may correspond to the second segment, and so on. The gnss-NavigationModel IE may provide GNSS Navigation Model assistance data as defined in LPP in 3GPP TS 36.355 and may be in the form of an octet string which may be ciphered. Additional IEs may be present in a SIB (not shown in Table 1) that indicate a particular type of segmentation (e.g. a Segmentation Option 1 versus a Segmentation Option 2 as described below) or a particular type of ciphering (e.g. a Segmentation Option 2 with independent ciphering versus a Segmentation Option 2 with dependent ciphering of each SIB segment as described below).

The ciphering key data (e.g. cipheringKeyData IE in Table 1) may be based on a 128-bit Advanced Encryption Standard (AES) cipher algorithm with counter mode, as used for LPPe, in which case the cipheringKeyData IE in Table 1 could be defined using ASN.1 as shown Table 2.

TABLE 2

```
-- ASN1START
CipheringKeyData ::=   SEQUENCE {
    cipherSetID                 INTEGER (0..65535),
    d0                          BIT STRING (SIZE (1..128)),
    ...
}
-- ASN1STOP
```

In Table 2, the cipherSetID IE may identify a cipher set comprising a cipher key value and a first component C0 of an initial counter C1 for AES counter mode. The d0 IE in Table 2 may provide a second component for the initial ciphering counter C1. The d0 IE is defined in Table 2 as a bit string with a length of 1 to 128 bits. A UE 102 may pad out the d0 IE bit string if less than 128 bits with zeroes in more significant bit positions to achieve 128 bits. The initial counter C1 may then be obtained from the IE d0 and the first component C0 (defined by the cipherSetID) as:

$$C1 = (d0 + C0) \bmod 2^{128} \quad (1)$$

In equation (1), all values may be treated as non-negative integers. The cipherSetID IE in Table 2 could also provide an identifier (or an identity) of the ciphering key used, which would enable an operator to use different ciphering keys for different SIBs (e.g. to support multiple subscription levels) and to change the value of a ciphering key without disrupting UE 102 broadcast acquisition (e.g., if the new key was provided to UE 102 in advance).

The first component C0 for the initial ciphering counter C1 may be provided point-to-point (e.g. as described for stage 5 in signaling flow 200). Multiple Cipher Sets may be provided to UE 102, each containing information relevant to ciphering of a particular System Information Block (i.e., different SIBs could have different ciphering keys to support multiple subscription levels). Each cipher set may include (at least) the information shown in Table 3, where each row in Table 3 below the top row defines a separate IE whose name is in the first column, ASN.1 data type is in the second column and purpose and usage is in the third column.

TABLE 3

| Cipher Set | | |
|---|---|---|
| cipherSetID | INTEGER (0 ... 65535) | This field specifies the cipher set ID. |
| cipherKey | BIT STRING (SIZE (128)) | This field specifies a cipher key as a bit string of size 128 bits. |
| C0 | BIT STRING (SIZE (1 ... 128)) | This field specifies the first component of the initial ciphering counter C1. If less than 128 bits, C0 may be padded out with zeroes in more significant bit positions to achieve 128 bits. |
| SIBType | ENUMERATED (sib-x, sib-y, sib-z, ... ) | This field specifies the SIB Type for which the Cipher Set data is applicable. |
| Time of applicability & validity time | E.g., System Frame Number (SFN), UTC, etc. | |

A UE 102 with proper subscription may receive multiple Cipher Sets as defined above (i.e., one set for each SIB type for which the UE 102 has a subscription for receiving broadcast AD). Therefore, some UEs may have access to all data while other UEs can only access a subset, depending on their subscription. The delivery of the Cipher Set(s) to subscribed UEs may use a mobility management procedure, as described for stage 5 in signaling flow 200. Alternatively, or in addition, a Supplementary Services procedure could be used, as also mentioned above.

The assistanceDataSegmentType IE and assistanceDataSegmentNumber IE in Table 1 may provide segmentation information to UE 102. However, for segmentation of assistance data there may be two principle possibilities referred to herein as "Segmentation Option 1" and "Segmentation Option 2".

With Segmentation Option 1 (also referred to as "Octet String Segmentation"), the assistance data is first encoded (e.g. using ASN 0.1) and then optionally ciphered with the resulting encoded (and ciphered) octet string or bit string then being segmented. This means that all segments (e.g. octet strings) of a SIB may have to be received and assembled by a UE 102 before deciphering (if needed) and ASN.1 decoding of the assistance data IE by the UE 102 can commence. The cipheringKeyData IE in Table 1 may have to be included in the first SIB segment only.

With Segmentation Option 2 (also referred to as "Pseudo-segmentation"). the assistance data are segmented before encoding and any encrypting. This means that each segment may be a valid and independent ASN.1 encoded message (or set of ASN.1 parameters) that may also be ciphered. For example, a segment may comprise a complete GNSS navigation model for one or more satellites. The cipheringKeyData IE in Table 1 may then have to be included in each SIB segment or in the first SIB segment only, as discussed below.

For Segmentation Option 1, the same ciphering could be used for the whole encoded (and ciphered) octet string (or bit string). Therefore, the cipheringKeyData IE could be included in the first SIB segment only. Since the ciphering key data in Table 2 can be around 18 octets for AES ciphering, this could reduce the SIB overhead for the subsequent SIB segments by around 18 octets for each segment.

However, for Segmentation Option 2, there would be two possibilities. One possibility is Segmentation Option 2 with independent ciphering of each SIB segment. Since each SIB segment may be an independent assistance data IE, each SIB-segment could be ciphered independently. Therefore, the UE 102 can use the data in a SIB segment immediately after the SIB segment has been received. However, the cipheringKeyData IE would then need to be included in each SIB segment. Another possibility is Segmentation Option 2 with dependent ciphering of each SIB segment. With this, the same ciphering can also be used for all SIB segments starting with the first segment and continuing to the last segment. Conceptually, all the encoded assistance data (AD) segments (each comprising an octet or bit string) would be concatenated into a single octet (or bit) string, ciphered, and then separated again into different (ciphered) assistance data segments. With the AES counter mode ciphering method, this may equate to an exclusive OR (XOR) logical bit operation for the single concatenated octet or bit string (of unciphered AD) with a single cipher string. However, a UE 102 implementation may not need to do any concatenation and could instead compute the cipher string and XOR different portions of it with different incoming ciphered SIB segments in order to perform deciphering. A restriction may be that a UE 102 would have to start the deciphering at the first SIB segment and not at a subsequent SIB segment (e.g. in order to know the number of previous SIB octets). However, compared to Segmentation Option 1, the UE 102 would still be able to decipher each SIB segment when received and not wait until all segments were received. The UE 102 may have to wait for the first SIB segment to start deciphering but the UE 102 does not need to wait for the last segment and can decipher each segment as soon as it is received. The cipher key data may then need to be provided in the first SIB segment only (e.g. as in case for Segmentation Option 1).

If a number N of SIB segments are assumed to be broadcast at intervals of T seconds (e.g. with a complete SIB broadcast period of N*T seconds), the average latency at UE 102 to receive or begin obtaining deciphered AD from broadcast SIB segments may be as shown (in the third column) in Table 4.

TABLE 4

| | | Average Latency |
|---|---|---|
| (1) | Segmentation Option 1: | $1.5 \times N \times T$ |
| (2) | Segmentation Option 2 with independent ciphering of each segment: | $0.5 \times T$ |
| (3) | Segmentation Option 2 with dependent ciphering of each segment: | $0.5 \times N \times T$ |

Table 4 shows that Segmentation Option 1 may have the highest average latency, but may also have the lowest SIB-segment overhead (since cipheringKeyData would have to be included in the first SIB segment only). Segmentation Option 2 with independent ciphering of each segment may have the lowest average latency, but may also have the highest SIB-segment overhead (since cipheringKeyData may have to be included in each SIB segment). Segmentation Option 2 with dependent ciphering of each segment may be between Segmentation Option 1 and Segmentation Option 2 with independent ciphering of each segment in terms of latency and may also have low SIB segment overhead.

For generating and formatting the SIBs at stage 1 in signaling flow 200, there may be two principle alternatives, referred to here as Formatting Alternative 1 and Formatting Alternative 2: With Formatting Alternative 1, SIB formatting and encoding occurs at the E-SMLC 110. Here, the E-SMLC 110 encodes the data according to the SIB definition (e.g., as in the example in Table 1) and provides the complete SIB as an octet (or bit) string to the eNB 104. The E-SMLC 110 may thus ASN.1 encode the assistance data element (e.g., GNSS Navigation Model in Table 1), and possibly according to the ASN.1 encoding for LPP, and may optionally cipher the encoded octet (or bit) string. The E-SMLC 110 may also determine the needed control parameters (e.g., segmentation IEs in Table 1), and the Ciphering Key data, and may ASN.1 encode the complete SIB (e.g. as in Table 1). Therefore, the SIB content (including ciphering and segmentation details) may be transparent to the eNB 104, and the eNB 104 may only need to include the octet (or bit) string received from E-SMLC 110 in an SI message for broadcast at stage 3 in signaling flow 200. If the SIB needs to be segmented, the E-SMLC 110 may also perform the segmentation (e.g. as described above) and may provide the encoded (and ciphered) SIB segments to eNB 104 as complete octet (or bit) strings (at stage 2 in signaling flow 200) for broadcast by eNB 104 at stage 3 in signaling flow 200.

In order to schedule the SIB broadcast correctly, the eNB 104 may need to know, in addition to the octet (or bit) string to be broadcast, a GNSS identity (ID) (when applicable to the SIB) and whether or not the SIB is segmented into multiple segments. The eNB 104 may also need to know whether the SIB content is ciphered or not (e.g., to let the UE 102 know a priori know which SIBs will be ciphered). Therefore, an LPPa message used to transfer a SIB from E-SMLC 110 to eNB 104 at stage 2 of signaling flow 200, where Formatting Alternative 1 is used, may be as shown in Table 5.

TABLE 5

| IE/Group Name | Presence | Range | IE type and reference | Semantics description |
|---|---|---|---|---|
| Scheduling Info | | 1 | | |
| >GNSS ID | O | | ENUMERATED ( . . . ) | |
| >SBAS ID | O | | ENUMERATED ( . . . ) | |
| >Cipher Flag | M | | BOOLEAN | |
| >si-Periodicity | M | | ENUMERATED ( . . . ) | |
| SIB Type XX | | 1 . . . <maxSegments> | | Sorted according to increasing assistanceDataSegment Number |
| >Segment | | | OCTET STRING | |

In Table 5, the SIB that is transferred may comprise an unsegmented SIB or may comprise a SIB comprising two or more SIB segments, where the Segment IE in Table 5 corresponds to the unsegmented SIB or to one of the SIB segments (with separate instances of the Segment IE then included for each SIB segment). In Table 5, a greater than (">") symbol in the leftmost column indicates an IE that is part of an immediately preceding (higher up) IE without such a symbol; an "O" or "M" in the second column indicates that an IE is optional or mandatory, respectively; an entry in the third column indicates an allowed range for the number of occurrences of an IE; an entry in the fourth column indicates an ASN.1 data type for an IE; and an entry in the rightmost column provides some optional description for an IE. The conventions used in Table 5 are similar to those used to define LPPa in 3GPP TS 36.455. The same conventions are also used below for Tables 6. 7, 8, 9 and 10.

With Formatting Alternative 2, SIB Formatting and Encoding occurs at the eNB 104. Here, the E-SMLC 110 provides the individual IEs according to the SIB definition to the eNB 104 and the eNB 104 encodes the SIB. In this case, the LPPa message used to transfer AD at stage 2 in signaling flow 200 may primarily include the encoded and possibly ciphered assistance data (AD) element as an octet or bit string. The AD could be provided per SIB or as a list of AD elements together with needed control information. For example, the data transferred at stage 2 of signaling flow 200 could be as shown in Table 6 in the case of AD for a GNSS Navigation model (where an SBAS indicates a Satellite based augmentation system).

DataSegmentNumber IE in Table 1) and includes ciphering key data (e.g. the CipheringKeyData IE in Table 6) only in the first SIB segment. Alternatively, segmentation at E-SMLC 110 would also be possible, and in this case the E SMLC 110 could provide a list of octet string (or bit string) AD segments for each SIB segment together with the ciphering key data (e.g. the CipheringKeyData IE in Table 6) for the first SIB segment only.

With Formatting Alternative 2 and Segmentation Option 2, segmentation must be performed at the E-SMLC 110 (since ASN.1 encoding and ciphering are both performed at the E-SMLC 110). In this case, E-SMLC 110 may provide a list of octet (or bit) string AD segments for each SIB segment to eNB 104 together with control parameters (e.g., the assistanceDataSegmentType IE and assistanceDataSegmentNumber IE in Table 1), as well as ciphering key data (e.g. the CipheringKeyData IE in Table 6) either for the first SIB segment only, or for all SIB segments, as described previously for Segmentation Option 2.

The two formatting alternatives for providing the SIB data to the eNB 104 may have the following properties. Formatting Alternative 1 may have less eNB 104 impacts than Formatting Alternative 2. Formatting Alternative 1 may avoid the eNB 104 knowing about or needing to support ciphering. Formatting Alternative 1 may be more efficient in terms of processing than Formatting Alternative 2, since SIBs common to several eNBs may have to be formatted only once in the system (by E-SMLC 110) and not by each eNB separately. Formatting Alternative 1 may allow faster implementation for any future changes to ciphering, seg-

TABLE 6

| IE/Group Name | Presence | Range | IE type and reference | Semantics description |
|---|---|---|---|---|
| GNSS ID | O | | ENUMERATED ( . . . ) | |
| SBAS ID | O | | ENUMERATED ( . . . ) | |
| SIB Type XX | | 1 . . . <maxSegments> | | Depends on Segmentation Option |
| >cipheringKeyData | O | | CipheringKeyData | SEQUENCE |
| >gnss-NavigationModel | M | | OCTET STRING | |

With Formatting Alternative 2, the SIB content would not be transparent to the eNB 104. Only the assistance data element (e.g., gnss NavigationModel in Table 6) may be transparent, since this would be encoded and possibly ciphered at the E-SMLC 110.

With Formatting Alternative 2 and Segmentation Option 1, the assistance data octet or bit string (e.g., gnss-Navigation Model in Table 6) could be segmented at the eNB 104, and the eNB 104 may determine the SIB control parameters (e.g., the assistanceDataSegmentType IE and assistancementation or SIB content than Formatting Alternative 2, because eNB 104 changes may not be needed. In addition, the SIB content for Formatting Alternative 1 might be defined as a simple octet (or bit) string for RRC in 3GPP TS 36.331 with the detailed SIB content (e.g. as exemplified in Table 1) defined in another TS such as the LPP TS in 3GPP TS 36.355.

Two options for LPPa procedures for transfer of positioning assistance data from an E-SMLC 110 to an eNB 104, as at stage 2 in signaling flow 200, using LPPa may be possible.

These are referred to herein as LPPa Option 1 and LPPa Option 2. With LPPa Option 1, a class 1 LPPa procedure is used to enable the E-SMLC 110 to request broadcasting of positioning assistance data by the eNB 104 which is followed by a class 2 LPPa procedure to convey the assistance data from the E-SMLC 110 to eNB 104. With LPPa Option 2, a class 1 LPPa procedure is used to enable the E-SMLC 110 to request broadcasting of positioning assistance data, which also conveys the assistance data.

As defined for LPPa in 3GPP TS 36.455, a class 1 LPPa procedures may comprise an LPPa request or command message sent from a first entity (e.g. E-SMLC 110) to a second entity (e.g. eNB 104) with an LPPa response message (e.g. indicating success or failure) returned by the second entity to the first entity. In contrast, with an LPPa class 2 procedure, an LPPa request or command message may be sent from the first entity to the second entity without an LPPa response message being returned.

With LPPa Option 1, the eNB 104 may provide "feedback" (e.g. an amount of radio resources available for broadcasting assistance data) to the E-SMLC 110, to help the E-SMLC 110 suitably size the assistance data. With LPPa Option 2, the eNB 104 receives the assistance data using LPPa and may provide "feedback" (e.g. which parts of the assistance data eNB 104 was not able to configure for broadcasting) in the response.

With LPPa Option 1 the level of SIB support may be negotiated between E-SMLC 110 and eNB 104 ahead of time (i.e., before providing the actual SIB data), whereas for LPPa Option 2, the E-SMLC 110 may initially assume certain SIB resources at the eNB 104, and may get the actual available SIB resources at the eNB 104 afterwards. A number of SIB resources may need to be negotiated between E SMLC 110 and eNB 104. The first resource may comprise Assistance data elements to broadcast. This may be a list of actual assistance data IEs (e.g., GNSS Navigation Model, OTDOA Assistance Data, etc.) or a list of SIB types. The second resource may comprise a desired broadcast periodicity. Each assistance data IE may have different requirements on broadcast periodicity. For example, RTK Observation Data from a GNSS reference station (e.g. reference station 171) may be broadcast once per second, whereas OTDOA assistance data may have a longer broadcast periodicity (e.g., 5 to 10 seconds). A third resource may comprise a particular combination of SIBs (or assistance data IEs) that are to be included (and broadcast) using the same SI message (or same type of SI message). For example, certain combinations of SIBs/assistance data IEs may preferably be included in the same set of SI messages (for example, GNSS Reference Time and RTK Observations; or GNSS Reference Time and GNSS Acquisition Assistance, etc.). A fourth resource may comprise a maximum SIB (or assistance data) segment size (e.g. which may be different for WB LTE versus NB-IoT).

Given a large number of possible combinations of SIB resources from the list above, it may be advantageous to negotiate the SIB broadcast resources between an eNB 104 and E-SMLC 110 ahead of time using LPPa Option 1.

With LPPa Option 2, the E-SMLC 110 may need to begin with a guess of available resources at the eNB 104 and select a certain set of possible assistance data IEs/SIBs to broadcast. Since the E-SMLC 110 may have no information on broadcast resources, the E-SMLC 110 may select more resources than are likely to be available initially. The eNB 104 may then have to select a subset of the assistance data/SIBs resources requested initially by the E-SMLC 110 and provide feedback on the selected subset to the E-SMLC 110. But since the eNB 104 may not be involved in positioning of UEs such as UE 102, eNB 104 may not know which subset of assistance data elements/SIBs make most sense (or are indeed needed) for a certain positioning method or for a certain GNSS type, and for a certain positioning mode (i.e., UE-assisted and/or UE-based, or GNSS with or without RTK, etc.).

Similarly, with LPPa Option 2 the E-SMLC 110 may have to assume a certain SIB size initially in order to segment and cipher the data. This initial assumption on SIB size may be sub-optimal, i.e., either too small or too large. A too small assumed SIB size may not trigger the eNB 104 feedback (since the request could be fulfilled) and, therefore, may not exploit the full broadcast capability. A too large selected SIB size may require a re-encoding and re-ciphering at the E-SMLC 110 based on eNB 104 feedback and may thus be inefficient.

LPPa Option 1 may enable the E-SMLC 110 to optimize SIB content and broadcasting before the actual SIB data is segmented, encoded and ciphered. The E-SMLC 110 may encode and cipher only those assistance data elements/SIBs which can actually be broadcasted by the eNB 104, and which are most suited for a certain positioning method or methods and positioning modes (UE-assisted, UE-based). If a maximum SIB size is low, the E-SMLC 110 may perform pseudo-segmentation (using Segmentation Option 2), or may decide not to provide this assistance data element via broadcast. If available broadcast periodicity is low, the E-SMLC 110 may only provide data with longer life time, etc.

With LPPa Option 1, a class 2 LPPa procedure may also be used to terminate (or modify) a previous reservation. For example, an eNB 104 could terminate (or modify) a previous reservation when resource availability had decreased or increased.

Figure 3A:
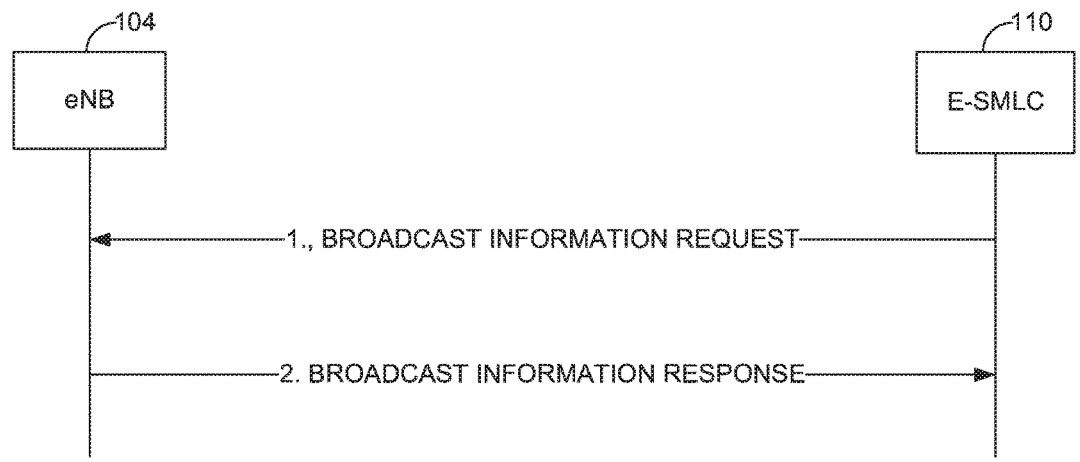

FIG. 3A shows a class 1 LPPa Broadcast Information Exchange procedure for LPPa Option 1 which may be initiated by the E-SMLC 110 at stage 1 to indicate to the eNB 104 the need to configure transmission of positioning SI messages and to receive the SI configuration information from the eNB 104 at stage 2. The content of the LPPa broadcast Information Request at stage 1 may be as shown in Table 7.

TABLE 7

| IE/Group Name | Presence | Range | IE type and reference |
|---|---|---|---|
| Message Type | M | | |
| LPPa Transaction ID | M | | |
| Requested SIB Types Transmission and Periodicity | M | | Table 9 below |

The "Requested SIB Types Transmission and Periodicity" IE shown in Table 7 may include a list of SIB Types to be broadcasted by the eNB 104 (e.g. sorted according to priority and grouped according to desired aggregation in SI messages) together with the desired periodicity or periodicities (e.g. sorted according to priority) for each SIB Type group/SI message. The corresponding response message at stage 2 may grant and/or modify the request as shown in Table 8.

TABLE 8

| IE/Group Name | Presence | Range | IE type and reference |
|---|---|---|---|
| Message Type | M | | 9.2.3 |
| LPPa Transaction ID | M | | 9.2.4 |
| SIB Types and Periodicity | M | | Table 9 below. |

The "SIB Types and Periodicity" IE in Table 8 may include all the information required by the E-SMLC 110 to encode and format the particular SIB type. Table 9 shows an example of the "Requested SIB Types Transmission and Periodicity" IE for Table 7 and the "SIB Types and Periodicity" IE for Table 8.

TABLE 9

| IE/Group Name | Presence | Range | IE type and reference |
|---|---|---|---|
| SIB Group List | | 1 ... <maxGroups> | One group may correspond to one System Information (SI) message |
| >SIB Types List | | 1 ... <maxSIBs> | Number of SIBs in a SI message |
| >SIB Type | M | | ENUMERATED (SIBx, SIBy SIBz, ... ) |
| >si-Periodicity | M | | ENUMERATED (rf8, rf16, rf32, rf64, rf128, rf256, rf512) |
| >Max SIB Size | M | | INTEGER(1 ... max) |

SIB groups may be included in priority order in Table 9 and SIB Types may likewise be included in priority order for each SIB group. If an eNB 104 does not have enough resources for the requested SIBs according to Table 9 in a BROADCAST INFORMATION REQUEST, the eNB 104 may reduce one or more of the requested periodicities and/or SIB maximum sizes and/or may remove one or more of the requested SIB groups or SIB types from the granted SIBs according to Table 9 in a BROADCAST INFORMATION RESPONSE. The reduction in resources may be applied preferentially to the lowest priority SIB groups and SIB types first, with higher priority SIB groups and SIB types not affected until resources for lower priority SIB groups and SIB types have been removed or minimized. Since this may degrade overall service more than if a more balanced reduction in resources over all SIB groups and SIB types was applied, it may be useful to include some extra information in a BROADCAST INFORMATION REQUEST (e.g. in Table 9) to specify how an eNB 104 should reduce resource allocation to SIB groups and SIB types. For example, there could be an additional IE in Table 9 which specifies whether the eNB 104 should attempt to reduce resources in a balanced manner across all SIB groups and SIB types without regard to priority or may reduce resources strictly based on priority. As another alternative, an E-SMLC 110 could include an IE indicating a minimum periodicity and a minimum SIB maximum size for each SIB type in a BROADCAST INFORMATION REQUEST (e.g. in Table 9) as well as a preferred periodicity and preferred SIB maximum size.

Figure 3B:
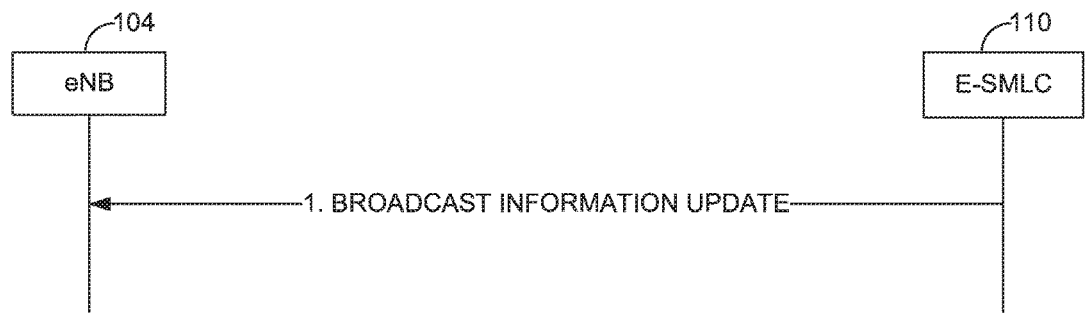

The actual broadcast SIBs may be subsequently delivered by E-SMLC 110 to eNB 104 using a BROADCAST INFORMATION UPDATE message as shown in FIG. 3B. The E-SMLC 110 may initiate the procedure by sending a BROADCAST INFORMATION UPDATE message to the eNB 104 at stage 1 in FIG. 3B. This message may contain data for one or more SIBs (e.g. as exemplified in Tables 5 and 6). The E-SMLC 110 may initiate the procedure whenever an assistance data SIB changes (e.g. due to change of the actual assistance data or due to change of the ciphering keys). For example, Table 10 shows possible content of a BROADCAST INFORMATION UPDATE message.

TABLE 10

| IE/Group Name | Presence | Range | IE type and reference | Semantics description |
|---|---|---|---|---|
| Message Type | M | | | |
| LPPa Transaction ID | M | | | |
| SIB Group List | | 1 ... <maxGroups> | | One group may correspond to one SI message |
| >SIB Types List | | 1 ... <maxSIBs> | | Number of SIBs in a SI message |
| >SIB Type | M | | Table 5 or Table 6 | |

Figure 3C:
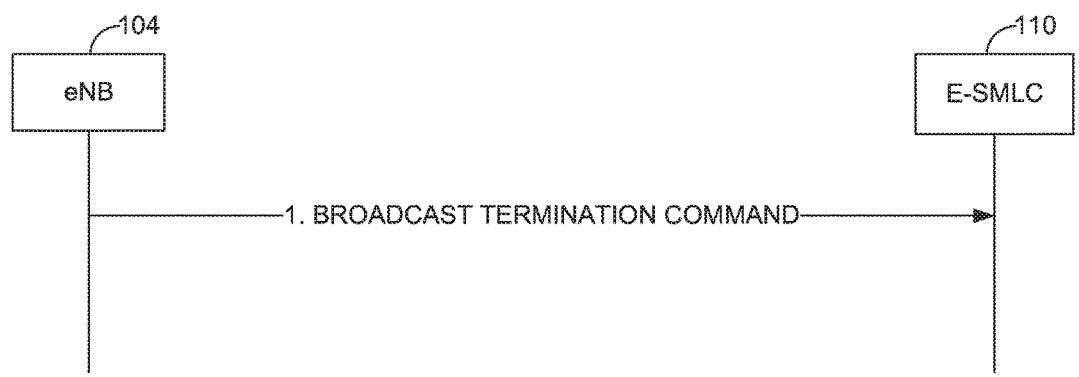

As mentioned above, an eNB 104 or E-SMLC 110 initiated ABORT or TERMINATION procedure may be needed to allow termination of a previously granted Broadcast Information Exchange procedure by the eNB 104 or E-SMLC 110, respectively. FIG. 3C shows one example of this where the eNB 104 initiates the termination at stage 1. E-SMLC 110 initiated termination may be similar with the TERMINATION message sent in the other direction.

Figure 3D:
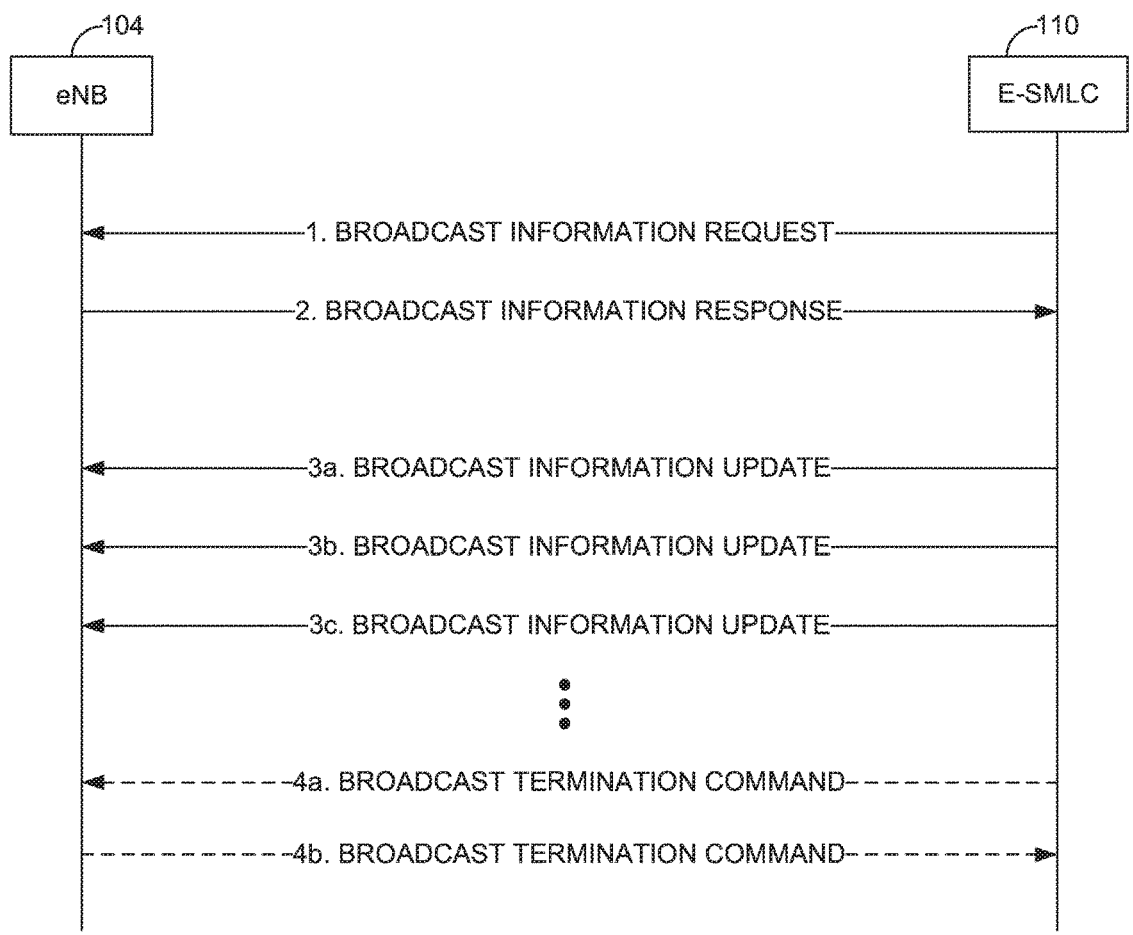

Therefore, based on FIGS. 3A-3C, stage 2 in FIG. 2 could be expanded into the stages shown in FIG. 3D. At stage 1 in FIG. 3D, the E-SMLC 110 requests information about available broadcast SIB resources from an eNB 104 as in FIG. 3A. This request may include a list of desired SIBs to be broadcasted together with desired broadcast periodicity for each SIB type.

At stage 2 in FIG. 3D, if the eNB 104 grants the request, it provides a list of possible SIBs which can be broadcasted, together with possible periodicity and other control parameters (such as maximum SIB size).

At stage 3 in FIG. 3D, the E-SMLC 110 encodes the data according to the SIB definition, and provides the data in BROADCAST INFORMATION UPDATE messages to the eNB 104 as in FIG. 3B. The information update for each SIB may comprise all of the data broadcast by the SIB—pre-encoded and pre-ciphered by E-SMLC 110 as applicable. The E-SLMLC 110 also provides updated information to eNB 104 by repeating stage 3 whenever assistance data changes or when a ciphering key is changed.

At stage 4 in FIG. 3D, at any time after stage 2, the eNB 104 or E-SMLC 110 may terminate the broadcast update procedure as in FIG. 3C.

The eNB 104 and E-SMLC 110 may each be able to update the level of SIB support. This could be achieved by first terminating an ongoing procedure (e.g. as in FIG. 3C) and then restarting with negotiating new broadcast resources (e.g. as in FIG. 3A). Alternatively, an LPPa MODIFICATION COMMAND could be used for that purpose, e.g., in case the SIB resources in the eNB 104 changes, or assistance data availability in the E-SMLC 110 changes.

Figure 4:
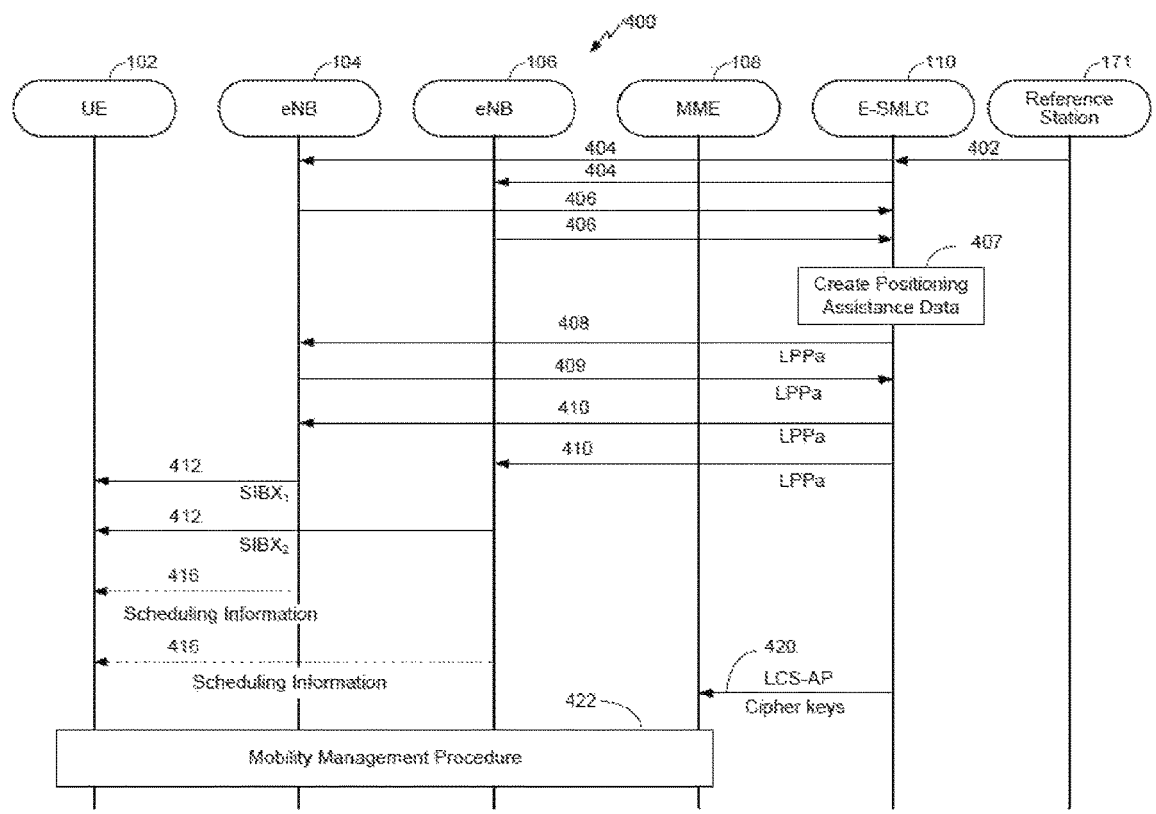

FIG. 4 shows an example signaling flow 400 applicable to communication system 100 shown in FIG. 1A for creating and distributing positioning assistance data for use by UE devices such as UE 102 in positioning operations. Signaling flow 400 may be similar to or the same as signaling flow 200 in FIG. 2 and is provided to describe and clarify additional embodiments and techniques. As pointed out previously, features of FIG. 4 may also be implemented using communication system 101 shown in FIG. 1B without deviating from claimed subject matter. For example, in an implementation of FIG. 4 using communication system 101, eNBs 104 and 106 may be replaced by gNBs 111-1 and 111-2, respectively, MME 108 may be replaced by AMF 182, E-SMLC 110 may be replaced by LMF 184, and usage of LPPa may be replaced by usage of NRPPa.

According to an embodiment, E-SMLC 110 may receive messages from multiple sources comprising location information (e.g. location parameters) for GNSS positioning, Real Time Kinematic (RTK) positioning, OTDOA positioning, or a combination thereof. For example, location parameters for GNSS positioning may comprise orbital data, almanac data and/or timing data for one or more GNSS satellites or space vehicles (SVs); location parameters for OTDOA positioning may comprise the locations of eNodeB antennas, cell timing and/or PRS parameters (e.g. PRS bandwidth, frequencies, subframe allocation) for cells; and location parameters for RTK positioning may comprise some or all data defined by the Radio Technical Commission for Maritime Services (RTCM) for one or more GNSSs (e.g. in RTCM Standard 10403.3 entitled "Differential GNSS (Global Navigation Satellite Systems) Services—Version 3.3"). In particular, E-SMLC 110 may receive messages 402 from reference station 171 comprising location parameters based on reports and observations from GNSS assets such as satellite 160. E-SMLC 110 may also transmit request messages 404 to eNBs 104 and 106 and receive response messages 406 from eNBs 104 and 106 comprising location parameters applicable to OTDOA positioning, for example. The location information applicable to OTDOA may comprise antenna locations, cell identities, cell timing, PRS parameters for eNBs 104 and 106. In an aspect, messages 404 and 406 may comprise LPPa messages applicable to communication system 100 shown in FIG. 1A. Alternatively, messages 404 and 406 may comprise NRPPa messages applicable to communication system 101 shown in FIG. 1B.

Based, at least in part, on location parameters obtained from messages 402 and 406, for example, E-SMLC 110 may create positioning assistance data (PAD) at block 407 for use by UE devices such as UE 102 in obtaining measurements, observations and/or estimates relating to a location of the UE 102 using various positioning techniques (e.g., GNSS, RTK, OTDOA, etc.). In an implementation, PAD created at block 407 may comprise a subset of PAD to be applied by a UE 102 and not the entire PAD to be used by a UE 102. For example, PAD created at block 407 may complement or augment PAD provided to UEs from other sources (e.g. provided by E-SMLC 110 point to point using LPP or LPP/LPPe or provided by LMF 184 using LPP or NPP). Also, PAD created at block 407 may comprise a subset of PAD for one particular LPP positioning method to be used in conjunction with other PAD for the one particular LPP positioning method. In an aspect, PAD created at block 407 may comprise some or all assistance data defined for position methods supported by LPP and/or LPPe such as UE assisted A-GNSS, UE based A-GNSS, UE assisted OTDOA, UE based OTDOA, UE assisted RTK and/or UE based RTK.

According to an embodiment, E-SMLC 110 may encode PAD created at block 407. The encoding may be based on LPP such that E-SMLC 110 encodes PAD as one or more ASN.1 parameters defined for LPP. For example, E-SMLC 110 may encode PAD as System Information Blocks (SIBs). For example, each SIB may comprise PAD for one LPP position method and may comprise a subset of the assistance data defined in LPP for that position method. As an example, a separate SIB may be used to convey PAD for each of UE based OTDOA for wideband (WB) LTE, UE assisted OTDOA for WB LTE, UE based OTDOA for narrowband (NB) LTE (e.g. NB-IoT) and UE assisted OTDOA for NB LTE (e.g. NB-IoT). Similarly, a separate SIB may be used to convey PAD for each of different types of GNSS AD such as GNSS orbital parameters, GNSS acquisition assistance parameters, GNSS ionospheric parameters and GNSS timing parameters. Further, other SIBs may be used to convey assistance data, where the assistance data supports RTK positioning and/or contains RTCM messages, as described later herein. Furthermore, at block 407 E-SMLC 110 may tailor PAD for particular cells being served by eNBs 104 and 106. For example, SIBs for one particular cell may be tailored to contain PAD particularly relevant to that particular cell, which may be different from SIBs containing PAD for other cells. As an example, in the case of PAD for a SIB supporting OTDOA, the SIB for a particular first cell may be based on the first cell as the serving and/or reference cell for a UE 102 and may provide OTDOA related information for the first cell and for one or more other cells (e.g. neighbor cells) nearby to the first cell. The SIB for the first cell may differ from the SIB for some other second cell which may provide OTDOA related information for a different set of cells than the first cell or be based on the second cell rather the first cell as being the serving and/or reference cell.

Optionally, E-SMLC 110 may reserve resources at eNB 104 and/or eNB 106 for broadcast of PAD created at block 407 by sending LPPa messages 408 to eNB 104 (as shown in FIG. 4) and/or eNB 106 (not shown in FIG. 4). Messages 408 may indicate the SIBs to be broadcast by eNBs 104 and/or 106, the periodicity for each SIB and/or the maximum SIB message size to be broadcast for each SIB. ENB 104 and/or eNB 106 may reserve some or all of the resources requested by messages 408 and may return LPPa messages 409 to E-SMLC 110 indicating the resources that were reserved (as shown in FIG. 4 for eNB 104 but not shown in FIG. 4 for eNB 106). LPPa messages 409 may indicate the SIBs for which resources have been reserved or agreed by eNBs 104 and/or 106, the allowed periodicity for each SIB and/or the maximum allowed SIB message size to be broadcast for each SIB.

E-SMLC 110 may send PAD created and encoded at block 407 to eNBs 104 and 106 in LPPa messages 410. The PAD sent in LPPa messages 410 may be based on any resources reserved in eNBs 104 and 106 by messages 408 and 409 when these messages are sent. An LPPa message 410 sent by E-SMLC 110 to eNB 104 or eNB 106 may comprise one or more SIBs containing encoded PAD or encoded and optionally ciphered PAD for one or more SIBs, where each SIB is to be broadcast by one cell supported by eNB 104 or eNB 106. In addition, E-SMLC 110 may send LPPa messages 410 to eNBs 104 and 106 to provide updated SIBs or updated PAD in response to changes in PAD obtained at block 407 (e.g. caused by receipt of new or updated location information by E-SMLC 110 in message 402 and/or 406).

In one embodiment, E-SMLC 110 may encode the entire content for each SIB including the PAD contained in the SIB and information related to optional ciphering of the PAD and/or optional segmentation of the SIB (as described below). In this embodiment, the information related to optional ciphering of the PAD and optional segmentation of the SIB may not be visible to eNBs 104 and 106 (e.g. may not be decoded or interpreted by eNBs 104 and 106). In another embodiment, E-SMLC 110 may encode the PAD and may provide information related to optional ciphering of the PAD and optional segmentation of the SIB to eNBs 104 and 106 in separate parameters in message 410 that may be decoded and interpreted by eNBs 104 and 106.

According to an embodiment, certain PAD encoded for SIBs for transmission in LPPa messages 410 may further be encrypted by E-SMLC 110 prior to sending in messages 410 (e.g. using the Advanced Encryption Standard (AES)) according to a ciphering key (e.g. a 128 bit ciphering key). One or more SIBs in LPPa messages 410 may be accompanied by (e.g. may contain) an indication to recipient eNB devices 104 and 106 that PAD in certain SIBs is encrypted. For example, a SIB may be accompanied by an identifier or identity (ID) for a particular ciphering key that was used to encrypt the PAD in the SIB to indicate which ciphering key was used.

According to an embodiment, E-SMLC 110 may transmit one or more messages comprising ciphering keys used to encrypt PAD in SIBs created at block 407 to one or more other nodes in a network. For example, E-SMLC 110 may transmit a message 420 to MME 108 (e.g. a Location Services Application Protocol (LCS-AP) message) containing information for ciphering keys used to encrypt PAD in SIBs. The information for each ciphering key may comprise the ciphering key value (e.g. 128 bits for AES), an identifier for the ciphering key (e.g. an integer, character string or binary value), a time of applicability for the ciphering key (e.g. indicating a time period during which the ciphering key may be used by E-SMLC 110), a geographic area of applicability (e.g. indicating in which part of a network PAD encrypted by the ciphering key will be broadcast in SIBs), or a combination thereof. In one embodiment, the time of applicability may comprise a start time or an end time, a duration, or a combination thereof. In another embodiment, the geographic area of applicability may comprise at least one cell for the network, at least one location area for the network, at least one tracking area for the network, or at least one geographic area defined using coordinates (e.g. latitude and longitude coordinates).

According to an embodiment, MME 108 may forward to UEs 102 at least a portion of the information for ciphering keys used to encrypt PAD in SIBs that was received in one more messages 420. Parameters that are forwarded for each ciphering key may comprise the ciphering key value (e.g. 128 bits for AES), an identifier for the ciphering key (e.g. an integer, character string or binary value), a time of applicability for the ciphering key (e.g. indicating a duration during which the ciphering key may be used by E-SMLC 110), a geographic area of applicability (e.g. indicating in which part of a network PAD encrypted by the ciphering key may be broadcast in SIBs), or a combination thereof. These parameters may be forwarded to a UE 102 as part of a mobility management (MM) procedure 422. For example, MME 108 may forward at least a portion of the contents of messages 420 to UE 102 in the course of a particular procedure such as an Attach procedure, Tracking Area Update (TAU) procedure or Service Request mobility management procedure, just to provide a few examples. Here, MME 108 may forward at least a portion of the contents of messages 420 (e.g., ciphering keys used to encrypt PAD in SIBs along with identifiers of the ciphering keys, a time of applicability, a geographic area of applicability, or a combination thereof) to UE 102 in a Non-Access Stratum (NAS) Attach Accept message, a NAS TAU Accept message, a NAS Authentication Response message, a Downlink NAS Transport message, a Downlink Generic NAS Transport message and/or a NAS Service Accept message.

In one embodiment, in order to avoid sending information for ciphering keys used to encrypt PAD to a UE that does not have a subscription for receiving ciphered PAD, MME 108 may only send the information for ciphering keys to UE 102 using MM procedure 422 if subscription data for UE 102 (e.g. received from HSS 145) indicate that UE 102 has a subscription to receive ciphered PAD. Further, MME 108 may only send ciphering key information to UE 102 for particular SIBs for which UE 102 has a subscription to receive ciphered PAD. Furthermore, in order to avoid sending information for ciphering keys used to encrypt PAD to a UE 102 that either does not need the information or has previously received the information, MME 108 may only send the information for ciphering keys to UE 102 if UE 102 provides a request or indication that the ciphering key information is needed. For example, in an embodiment of MM procedure 422, UE 102 may include an indication in a NAS Attach Request, a NAS TAU Request, a NAS Service Request or a NAS Registration Request that ciphering key information for PAD is needed or requested. The indication may be included by UE 102 when UE 102 needs the PAD (e.g. to assist location of UE 102) and when any previous ciphering key information provided to UE 102 by MME 108 (or by another MME) is no longer valid. For example, UE 102 may determine that previous ciphering key information provided to UE 102 by MME 108 (or by another MME) is no longer valid when a time of applicability for the previous ciphering key information has expired, when UE 102 moves outside a geographic area of applicability for the previous ciphering key information, or when UE 102 receives one or more SIBs broadcast by eNB 104 (or another eNB such as eNB 106) which contain ciphered PAD and an indication that the PAD is ciphered using a ciphering key for which UE 102 does not have ciphering key information. MME 108 may then only send the ciphering key information to UE 102 (e.g. in a NAS Attach Accept, NAS TAU Accept or NAS Registration Accept message) when the indication is received from UE 102, which may avoid using signaling resources to unnecessarily send ciphering key information.

According to an embodiment, eNBs 104 and 106 may broadcast downlink messages 412 to UE 102 including, for example, PAD encoded into SIBs obtained from messages 410 received from E-SMLC 110. In an embodiment, downlink messages 412 may comprise messages (e.g. SI messages) for the Radio Resource Control (RRC) protocol defined in 3GPP TS 36.331. In this embodiment, an RRC message (e.g. an SI message) may comprise a single SIB, where the SIB may comprise (i) the encoded and optionally ciphered PAD created by E-SMLC 110 at block 407, and optionally (ii) an indication of ciphering (e.g. a ciphering key identity). In an implementation, eNB 104 may provide a list of desired SIBs (e.g., together with control parameters such as repetition rate, maximum SIB size, etc.) to E-SMLC 110 in messages 406. As pointed out above, block 407 may encode SIBs for PAD tailored for particular cells. As illustrated in FIG. 4, eNB 104 may include PAD for a first cell encoded in a SIB $SIBX_1$ in a first downlink message 412 that is broadcast in the first cell, while eNB 106 may include PAD for a second cell encoded in a SIB $SIBX_2$ in a second downlink message 412 that is broadcast in the second cell. The PAD in SIBs $SIBX_1$ and $SIBX_2$ may be encoded according to the LPP protocol and the SIB (including the already encoded PAD) may be further encoded according to the RRC protocol. As pointed out above, PAD encoded in SIBs $SIBX_1$ and $SIBX_2$ may each comprise a subset of assistance data for one LPP position method (e.g. such as GNSS, OTDOA or RTK).

Further as pointed out above, PAD in SIBs $SIBX_1$ and $SIBX_2$ may have been encrypted at block 407 according to ciphering keys. In that case, SIBs $SIBX_1$ and $SIBX_2$ may further comprise an indication of ciphering (e.g., including an identifier of a ciphering key).

In some embodiments, in order to avoid broadcast of SIB messages 412 exceeding some maximum size (e.g. 100 to 280 octets), eNB 104 and/or eNB 106 may segment an encoded and optionally a ciphered SIB, that is received in an LPPa message 410 from E-SMLC 110, into two or more segments and may transmit each segment as a separate SIB message 412. Here, each transmitted SIB message 412 may include information about the segmentation such as whether segmentation is used, a segment number and/or a final segment indication. A UE 102 receiving SIB messages 412 containing SIB segments may reassemble the complete SIB message by receiving all segments 412 and using the included segmentation information to determine which SIB messages 412 to reassemble into the complete SIB message.

In some embodiments, segmentation of SIB messages 412 may be performed by E-SMLC 110 and not by eNBs 104 and 106 by sending of separate SIB message segments or separate PAD segments to eNBs 104 and 106 in LPPa messages 410. E-SMLC 110 may segment SIB messages 412 or PAD messages in two alternative ways. With "octet segmentation" (or "octet level segmentation" or "octet string segmentation"), E-SMLC 110 may segment SIB message 412 or PAD by splitting a sequence of octets for SIB message 412 or a PAD message into two or more sequences of octets where the content or values of the octets and the ordering of the octets are unchanged. With "pseudo-segmentation", E-SMLC 110 may split the assistance data to be contained in a SIB message 412 into separate sets of assistance data with either no overlap or minimal overlap of assistance data between the separate sets and may encode each set of assistance data in a separate SIB message or a separate PAD message where each separate SIB message or each separate PAD message may be a well formed message (e.g. a well formed ASN.1 message). E-SMLC 110 may then send the separate SIB messages or separate PAD messages to eNBs 104 and 106 in messages 410 with each separate SIB message or each separate PAD message being treated by eNBs 104 and 106 as if the separate message is an entire SIB message.

In some embodiments, in order to provide a UE 102 with information in advance concerning the timing and content of SIB messages 412, an eNB 104 and/or eNB 106 may optionally broadcast scheduling information 416 to UE 102. Scheduling information 416 broadcast by eNB 104 or eNB 106 may indicate when particular SIB messages 412 will later be broadcast by eNB 104 or eNB 106, respectively, and may include a periodicity for the particular SIB messages 412 and/or an indication of the content of the particular SIB messages 412 (e.g. such as the GNSS(s) for which assistance data in SIB messages 412 applies, the RTCM message types that are included in the SIB messages 412 and/or whether ciphering is used). UE 102 may then receive the scheduling information 416 and (e.g. based on UE 102 capabilities and UE 102 need or usage for particular assistance data) may decide which SIB messages 412 the UE 102 will later receive and store. In some embodiments, scheduling information 416 may be broadcast by eNB 104 and/or eNB 106 in a SIB 1 message (also referred to as SIB1) as defined for RRC in 3GPP TS 36.331.

As pointed out above, E-SMLC 110 may provide updates to PAD encoded in SIBs for particular cells in LPPa messages 410. For example, if eNB 104 or eNB 106 receives LPPa messages 410 with updates to PAD for $SIBX_1$ or $SIBX_2$ for a particular cell or particular geographic area, the eNB 104 may cease broadcasting a previous version of $SIBX_1$ or $SIBX_2$ for the particular cell or geographic area, and may commence broadcasting the $SIBX_1$ or $SIBX_2$ comprising the updated PAD instead.

UE 102 may receive PAD encoded and optionally ciphered in broadcast downlink messages 412 in SIBs $SIBX_1$ and/or $SIBX_2$. For example, UE 102 may receive (or receive an indication of) one or more SIBs containing PAD that are broadcast by eNB 104 in a serving cell for UE 102. UE 102 may then determine which SIBs to receive and decode based on (i) configured information in UE 102 concerning the position method(s) and PAD supported by each SIB, (ii) UE 102 capability to support the position method(s) and PAD in each SIB, (iii) whether UE 102 may already possess the PAD, and/or (iv) whether UE 102 needs PAD at the current time or in the near future in order to obtain location measurements or compute a location estimate. Depending on this determination, UE 102 may decode PAD from SIBs $SIBX_1$ and/or $SIBX_2$ for use in positioning operations described below in conjunction with FIG. 5. In an embodiment, UE 102 may associate a ciphering key identifier in a SIB $SIBX_1$ and/or $SIBX_2$ with a ciphering key (obtained from Mobility Management Procedure 414 as discussed above) for use in decrypting encrypted PAD in the SIB prior to decoding the PAD. UE 102 may then performing positioning operations in communication with E-SMLC 110 as described below with reference to FIG. 5.

Figure 5:
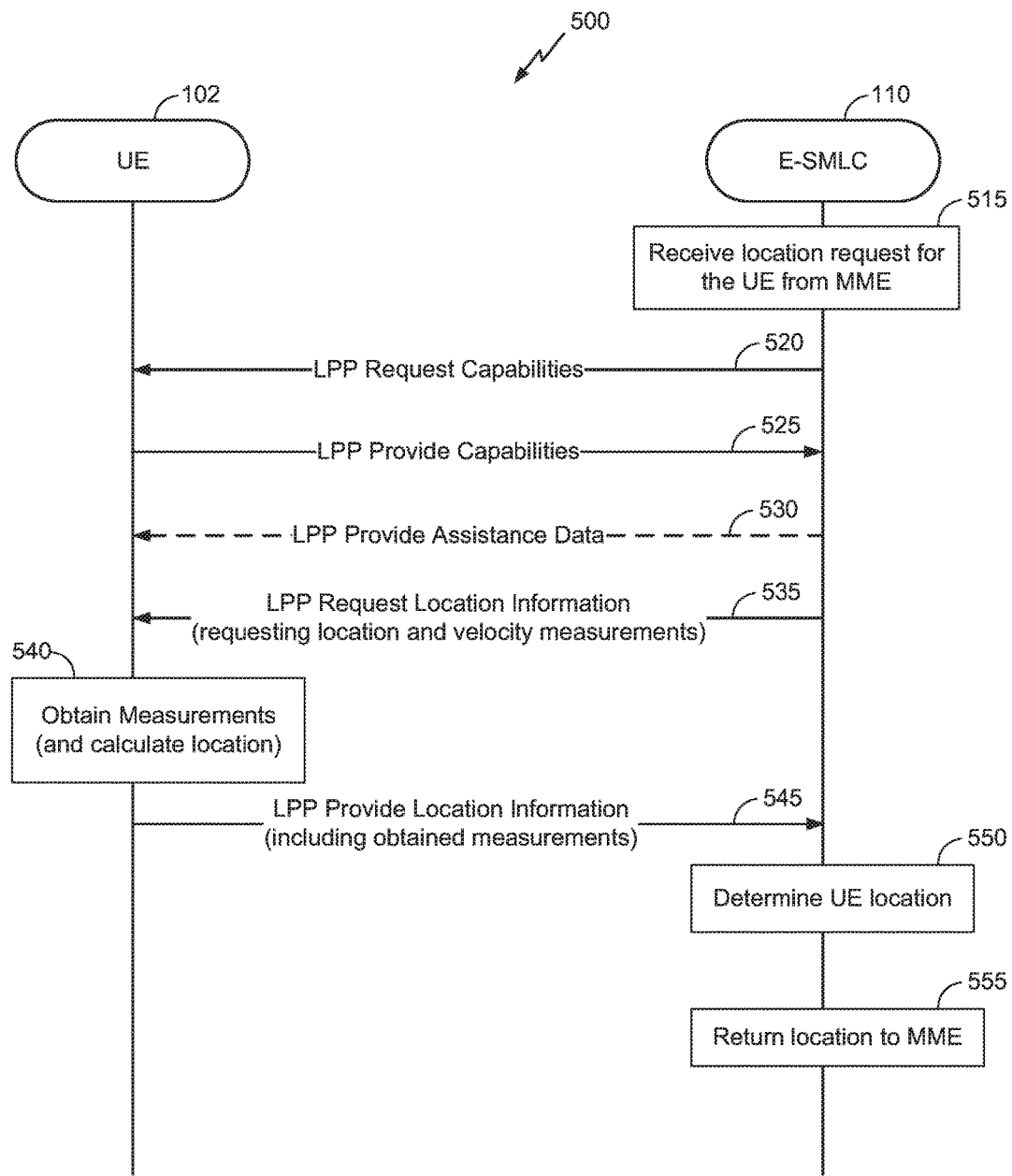

FIG. 5 shows a signaling flow 500, applicable to communication system 100 shown in FIG. 1A, illustrating communication between the UE 102 and the E-SMLC 110 that may take place in accordance with the techniques provided herein. It can be noted that here, messages are provided in accordance with the 3GPP LPP protocol as an example. However, embodiments are not so limited (e.g.

NPP or a combination of LPP and LPPe, referred to as LPP/LPPe, might be used in another embodiment).

At block 515, the process may be initiated when the E-SMLC 110 receives a location request for the UE 102—e.g. from the External Client 150 via the GMLCs 116 and 148 and MME 108.

At action 520, the E-SMLC 110 may send an LPP Request Capabilities message to the UE 102. The UE 102 can respond in accordance with the LPP protocol by providing various location-related capabilities, such as capabilities to support different position methods such as Assisted GNSS (A-GNSS), OTDOA, RTK, Enhanced Cell ID (ECID), and to support different network measurements and assistance data etc. These capabilities are provided by UE 102 at action 525 in the LPP Provide Capabilities message sent by the UE 102 to the E-SMLC 110.

At action 530, the E-SMLC 110 may send the UE 102 an LPP Provide Assistance Data message, in response to receiving the LPP Provide Capabilities message at action 525. Here, PAD provided in the LPP Provide Assistance Data message can be commensurate with the capabilities of the UE 102, as indicated in the LPP Provide Capabilities message. For example, if the UE 102 indicates that it is capable of obtaining location-related measurements for OTDOA, the E-SMLC 110 may provide a list of nearby cells (e.g. based on a current serving cell or serving eNB 104 for the UE 102) and information (e.g. timing, frequency, bandwidth) for signals (e.g. PRS or CRS signals) transmitted within these cells by corresponding base stations (e.g. eNB 104 and eNB 106), which may enable RSTD measurements by UE 102. Similarly, if UE 102 indicates support of A-GNSS in the LPP Provide Capabilities message sent at action 525, the E-SMLC 110 may include information for visible satellites 160 in the LPP Provide Assistance Data message sent at action 530. PAD provided in the LPP Provide Assistance Data message at action 530 may omit assistance data that is broadcast by eNBs 104 and 106 (e.g. in messages 412 in signaling flow 400). In some embodiments, action 530 may not occur—e.g. because all needed assistance data is broadcast by eNBs 104 and 106 in SIBs (e.g. in messages 412 and without ciphering), and possibly if the LPP Provide Capabilities message sent at action 525 indicates that UE 102 supports reception of broadcast messages containing PAD. In one embodiment, action 530 may be preceded by UE 102 sending an LPP Request Assistance Data message to E-SMLC 110 to request assistance data (not shown in FIG. 5). In this embodiment, UE 102 may only request assistance data that is supported by UE 102 but is not received from eNB 104 and/or eNB 106 via broadcast (e.g. in the broadcast messages 412).

At action 535, the E-SMLC 110 sends an LPP Request Location Information message to the UE 102. Here, the E-SMLC 110 may request location-related measurements (e.g. measurements for A-GNSS, OTDOA and/or RTK). In some embodiments, the LPP Request Location Information message may request that UE 102 compute a location estimate from these measurements (e.g. if the position method is UE based OTDOA or UE based A-GNSS) and may also include a requested accuracy for any location measurements or location estimate and/or a maximum response time.

At block 540, the UE 102 may obtain measurements requested at action 535. Location related measurements obtained by UE 102 may be obtained for RF signals transmitted by eNBs 104 and 106 and/or satellites 160. For example, location related measurements may include measurements of RSTD obtained by measuring PRS or other reference signals (e.g. CRS signals) transmitted by eNBs 104 and 106, measurements of RTT obtained by measuring signals transmitted from and/or to eNBs 104 and 106, and/or measurements of pseudorange, code phase or carrier phase obtained by measuring one or more navigation signals transmitted by each of one or more satellites 160. In some embodiments, UE 102 may also calculate a location estimate based on the obtained location measurements. The UE 102 may use PAD broadcast by eNBs 104 and 106 (e.g. in messages 412) and/or assistance data received at action 530 to help obtain the location measurements and/or determine any location estimate.

At action 545, information indicative of one or more location-related measurements (e.g. a location estimate or the location measurements) is sent to the E-SMLC 110 by the UE 102 in an LPP Provide Location Information message.

At block 550, the E-SMLC 110 can use the measurement information received at action 545 (comprising one or more location-related measurements or a location estimate) to determine (e.g. calculate or verify) an estimated location of the UE 102. The determined location estimate (and any accompanying uncertainty or expected error, if determined) may then be returned to the requesting entity at block 555.

In an embodiment applicable to the techniques described for FIGS. 2-5, assistance data for GNSS positioning may be split into common assistance data, independent of a particular GNSS, and GNSS specific assistance data, where the GNSS is indicated via a GNSS ID. All SIBs (except SIB1) for LTE access may be contained in SI messages. Each SI message may be transmitted periodically in time domain windows (SI-window) and SI-windows for different SI messages may not overlap. The length of the SI-window may be defined in a SIB1 and common for all SI messages. The scheduling information in SIB1 may allow a UE 102 to find an SI message to read the actual SIB(s) contained in the SI message. For example, a maximum of 32 SI messages may be generated for a particular cell by an eNB 104 or 106 (maxSI-Message), each containing a maximum of 32 SIBs (maxSIB).

For generic GNSS Assistance Data elements, scheduling information may be defined, which includes the GNSS-ID (and possibly SBAS-ID) as shown by the example in Table 11 which uses ASN.1.

TABLE 11

-- ASN1START
SystemInformationBlockType1-v15xy-IEs ::= SEQUENCE {
   gnss-schedulingInfoList-r15        GNSS-SchedulingInfoList-r15,
   nonCriticalExtension               SEQUENCE { }    OPTIONAL
}

TABLE 11-continued

```
GNSS-SchedulingInfoList-r15 ::= SEQUENCE (SIZE (1..maxSI-Message)) OF GNSS-
SchedulingInfo-r15
GNSS-SchedulingInfo-r15 ::=    SEQUENCE {
    si-Periodicity-r15              ENUMERATED {rf8, rf16, rf32, rf64,
                                                rf128, rf256, rf512},
    sib-MappingInfo-r15             GNSS-SIB-MappingInfo-r15
}
GNSS-SIB-MappingInfo-r15 ::= SEQUENCE (SIZE (1..maxSIB)) OF
GNSS-SIB-Type-r15
GNSS-SIB-Type-r15 ::= SEQUENCE {
    gnss-id-r15              GNSS-ID-r15,
    sbas-id-r15              SBAS-ID-r15               OPTIONAL,
    gnss-sib-type-r15        ENUMERATED { sibType22-7, sibType22-8,
                                sibType22-9, etc. (see Table below)
                             }
}
-- ASN1STOP
```

Common GNSS assistance data (not associated with a particular GNSS ID) and OTDOA assistance data may be defined within existing LTE scheduling information.

For each LPP assistance data element, a separate SIB may be defined as exemplified in Table 12 (which also includes assistance data elements for RTK).

location assistance data to a UE 102, where the location assistance data contains data defined according to message types defined by the Radio Technical Commission for Maritime Services (RTCM). Such location assistance data may be used to support RTK and/or PPP positioning of UE 102

TABLE 12

| | | | |
|---|---|---|---|
| GNSS Common Assistance Data | sibType22.1 | GNSS-ReferenceTime | These SIB Types could be added to existing SIB-Type field (SchedulingInfo). |
| | sibType22.2 | GNSS-ReferenceLocation | |
| | sibType22.3 | GNSS-IonosphericModel | |
| | sibType22.4 | GNSS-EarthOrientationParameters | |
| | sibType22.5 | RTK Common Assistance Data 1 | |
| | sibType22.6 | RTK Common Assistance Data 2 | |
| | ... | | |
| GNSS Generic Assistance Data | sibType22.7 | GNSS-TimeModelList | These SIB Types could be included in a GNSS-SIB-Type field (GNSS-SchedulingInfo) and associated with a GNSS-ID |
| | sibType22.8 | GNSS-DifferentialCorrections | |
| | sibType22.9 | GNSS-NavigationModel | |
| | sibType22.10 | GNSS-RealTimeIntegrity | |
| | sibType22.11 | GNSS-DataBitAssistance | |
| | sibType22.12 | GNSS-AcquisitionAssistance | |
| | sibType22.13 | GNSS-Almanac | |
| | sibType22.14 | GNSS-UTC-Model | |
| | sibType22.15 | GNSS-AuxiliaryInformation | |
| | sibType22.16 | BDS-DifferentialCorrections-r12 | |
| | sibType22.17 | BDS-GridModelParameter-r12 | |
| | sibType22.18 | RTK Generic Assistance Data 1 | |
| | sibType22.19 | RTK Generic Assistance Data 2 | |
| | ... | | |
| OTDOA Assistance Data | sibType23.1 | OTDOA UE Assisted | These SIB Types could be added to a SIB-Type field (SchedulingInfo). |
| | sibType23.2 | OTDOA UE Based | |

All SIBs exemplified in Table 12 could be added to the SystemInformation-r8-IEs ASN.1 IE in RRC in 3GPP TS 36.331.

The techniques described previously in association with Tables 1 to 6 and FIGS. 2-5 may also be used to support broadcasting (e.g. by an eNB 104, eNB 106 or gNB 111) of In one implementation, UE-based OTDOA assistance data definitions may also be used in LPP. However, in order to allow UE-assisted and UE-based OTDOA assistance data to be broadcast separately, position calculation information elements may be added to the top level assistance data as shown by the example in Table 13 which is based on ASN.1 encoding.

TABLE 13

```
-- ASN1START
OTDOA-ProvideAssistanceData ::= SEQUENCE {
    otdoa-ReferenceCellInfo          OTDOA-ReferenceCellInfo
                                             OPTIONAL,    -- Need ON
    otdoa-NeighbourCellInfo          OTDOA-NeighbourCellInfoList
                                                          OPTIONAL,
    -- Need ON
    otdoa-Error                      OTDOA-Error
                                                          OPTIONAL,
```

TABLE 13-continued

```
    -- Need ON
    ...,
    [[
    otdoa-ReferenceCellInfoNB-r14    OTDOA-ReferenceCellInfoNB-r14
                                                              OPTIONAL,
    -- Need ON
    otdoa-NeighbourCellInfoNB-r14    OTDOA-NeighbourCellInfoListNB-r14
                                          OPTIONAL    -- Need ON
    ]],
    [[
    positionCalculationInfo-r15      PositionCalculationInfo-r15
                                                              OPTIONAL,
    -- Cond ue-based
    positionCalculationInfoNB-r15    PositionCalculationInfoNB-r15
                                                              OPTIONAL
    -- Cond ue-based
    ]]
}
```

For the broadcast of OTDOA assistance data for LTE, it may further be advantageous to place UE-based and UE-assisted assistance data into different SIBs, to separate Narrowband (NB) and Wideband (WB) related assistance data and to support ciphering on a per SIB basis.

In one embodiment, it may be advantageous to include a single octet (or bit string) for PAD in a positioning SIB rather than to include several separate octet (or bit) strings. For example, if separate octet strings in the same SIB were ciphered in combination (e.g. after being concatenated), the ciphering could be more complex, particularly when segmentation was used. Alternatively, if separate octet strings in the same SIB were independently ciphered, the ciphering could be weakened due to reuse of the same ciphering procedure (e.g. same cipher code sequence) for the separate octet strings. As an illustration of this, ciphering methods such as AES counter mode and Data Encryption Standard (DES) perform ciphering through an exclusive OR (XOR) binary operation of the unciphered data with a cipher sequence derived from the cipher key and a counter (for AES) or an initial value (IV) (for DES). If the separate octet strings are ciphered in the same way (using the same cipher sequence for each octet string separately) and if some of the unciphered data is known in advance, it may become possible to recover some of the cipher sequence and use that to decipher other data. For example, if reference cell data for OTDOA hardly ever changes and can be known in advance, it could be used to recover part of the cipher sequence (by an XOR operation) and then to decipher neighbor cell data for OTDOA using the known cipher sequence.

Figure 6:
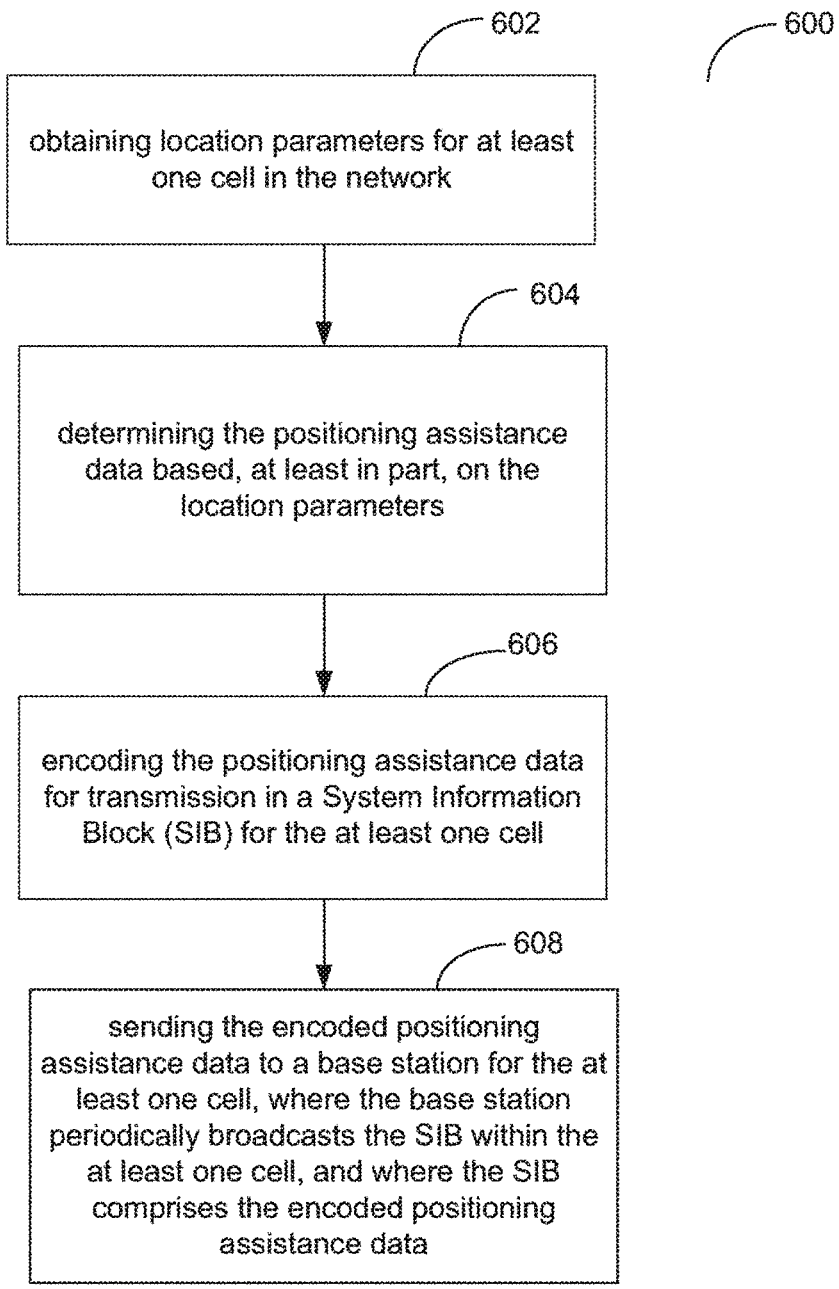
FIGS. 6 through 9 are flow diagrams for processes for supporting broadcast of positioning assistance data according to various embodiments.

FIG. 6 is a flow diagram of a process 600 for broadcasting positioning assistance data (PAD) in a network that may be performed by a location server such as an E-SMLC (e.g. E-SMLC 110) or an LMF (e.g. LMF 184) according to an embodiment. Process 600 may start at block 602, which may comprise obtaining location parameters for (or relevant to) at least one cell in a network, such as in messages 406 from eNBs 104 and 106 and message 402 from reference station 171 as discussed above. For example, the location server may receive at least one location parameter from a base station (e.g. a eNB 104 or 106, a gNB 111 or an ng-eNB), may receive at least one location parameter from a reference station (e.g. reference station 171) for RTK, may receive at least one location parameter from an RTK network, and/or may receive at least one location parameter from a GNSS reference network.

Block 604 may comprise determining the PAD (also referred to as location assistance data) based, at least in part, on the location parameters obtained at block 602 by, for example, performing actions described above for block 407 or for stage 1 for signaling flow 200. Block 606 may comprise encoding the PAD determined at block 604 into encoded PAD for transmission in a System Information Block (SIB) for the at least one cell. Encoding the PAD at block 606 may be as described for block 407 of signaling flow 400 and/or stage 1 of signaling flow 200. Block 608 may comprise sending the encoded PAD to a base station for the at least one cell, where the base station broadcasts (e.g. periodically) the SIB within the at least one cell, and where the SIB comprises the encoded PAD. Sending the encoded PAD at block 608 may be as described for LPPa messages 410 in signaling flow 400 and/or stage 2 of signaling flow 200. For example, sending the encoded PAD to the base station at block 608 may be responsive to a change in at least one location parameter.

In an aspect, the base station for block 608 is an evolved NodeB for Long Term Evolution (LTE)—e.g. the eNB 104 or eNB 106. In a 5G embodiment, the base station for block 608 may comprise a gNB (e.g. a gNB 111) or an ng-eNB in an NG-RAN (e.g. NG-RAN 135).

In an aspect, sending the encoded PAD to the base station at block 608 uses the LPPa or the NRPPa protocol for the sending. For example, LPPa may be used for a base station that is an eNB whereas NRPPa may be used for a base station that is a gNB or an ng-eNB.

In an aspect, the process 600 may further comprise sending a request to the base station requesting first resources for the transmission in the SIB, and receiving a response from the base station confirming second resources for the transmission in the SIB, where the second resources comprise the first resources or a subset of the first resources. For example, this aspect may be as described in association with FIG. 3A and messages 408 and 409 of signaling flow 400.

In an aspect, the PAD comprises assistance data for at least one position method. The at least one position method may comprise a position method supported by the LTE Positioning Protocol LPP) or by an NR Positioning Protocol (NPP) or by message types defined by the Radio Technical Commission for Maritime Services (RTCM). In this aspect, the encoding of the PAD at block 606 may be based on encoding for LPP or encoding for NPP or encoding for RTCM message types. In this aspect, the at least one position method may comprise UE assisted OTDOA for wideband LTE, UE assisted OTDOA for narrowband LTE (e.g. NB-IoT), UE based OTDOA for wideband LTE, UE based OTDOA for narrowband LTE, UE assisted OTDOA for NR, UE based OTDOA for NR, UE based A-GNSS, UE assisted A-GNSS, UE assisted Real Time Kinematics (RTK), UE based RTK, UE assisted Precise Point Positioning (PPP), or UE based PPP.

In an aspect, process 600 may further comprise ciphering the encoded PAD based on a ciphering key, and sending the ciphered and encoded PAD and an indication of ciphering to the base station at block 608. For example, the ciphering may be performed as described for signaling flow 200 and/or signaling flow 400. The base station may then (e.g. periodically) broadcast the SIB within the at least one cell, where the SIB comprises the ciphered and encoded PAD and the indication of ciphering. In this aspect, the indication of ciphering may comprise an identifier for the ciphering key. In this aspect, process 600 may further comprise sending ciphering key parameters descriptive of the ciphering key to a network node, where the network node provides the ciphering key parameters to at least one UE (e.g. UE 102). The network node may comprise an MME (e.g. MME 108) or an AMF (e.g. AMF 182). For a network node comprising an MME, the ciphering key parameters may be sent to the network node sending using a Location Services Application Protocol (e.g. LCS-AP as defined in 3GPP TS 29.171). The ciphering key parameters sent to the network node may comprise a ciphering key value, a ciphering key identifier, a time of applicability, an indication of the SIB, a geographic area of applicability, or a combination thereof. The time of applicability may comprise a start time, an end time or a duration, or a combination thereof. The geographic area of applicability may comprise the at least one cell for the network, at least one location area for the network, at least one tracking area for the network or at least one geographic area defined using coordinates (e.g. latitude and longitude coordinates).

In an aspect, process 600 may further comprise encoding the SIB for the at least one cell; where the encoded SIB comprises the encoded positioning assistance data, and sending the encoded SIB to the base station for the at least one cell at block 608, where the base station (e.g. periodically) broadcasts the encoded SIB within the at least one cell. This aspect may be as described for signaling flow 200 for Formatting Alternative 1.

In an aspect, the PAD determined at block 604 comprises positioning parameters for at least one cell nearby to the at least one cell (e.g. comprises parameters for neighbor cells to support OTDOA).

In an aspect, process 600 further comprises segmenting the PAD determined at block 604 into a plurality of PAD segments. encoding each PAD segment in the plurality at block 606 for transmission in the SIB for the at least one cell, and sending the plurality of encoded PAD segments to the base station for the at least one cell at block 608, where the base station (e.g. periodically) broadcasts the SIB within the at least one cell, and where the SIB comprises at least one (e.g. exactly one) of the encoded PAD segments of the plurality. For example, this aspect may correspond to pseudo-segmentation (Segmentation Option 2) as described previously for signaling flow 200.

In an aspect, process 600 may further comprise segmenting the encoded PAD from block 606 into a plurality of encoded PAD segments, and sending the plurality of encoded PAD segments to the base station for the at least one cell, where the base station periodically broadcasts the SIB within the at least one cell, and where the SIB comprises at least one (e.g. exactly one) of the encoded PAD segments of the plurality. For example, this aspect may correspond to octet string segmentation (Segmentation Option 1) as described previously for signaling flow 200.

Figure 7:
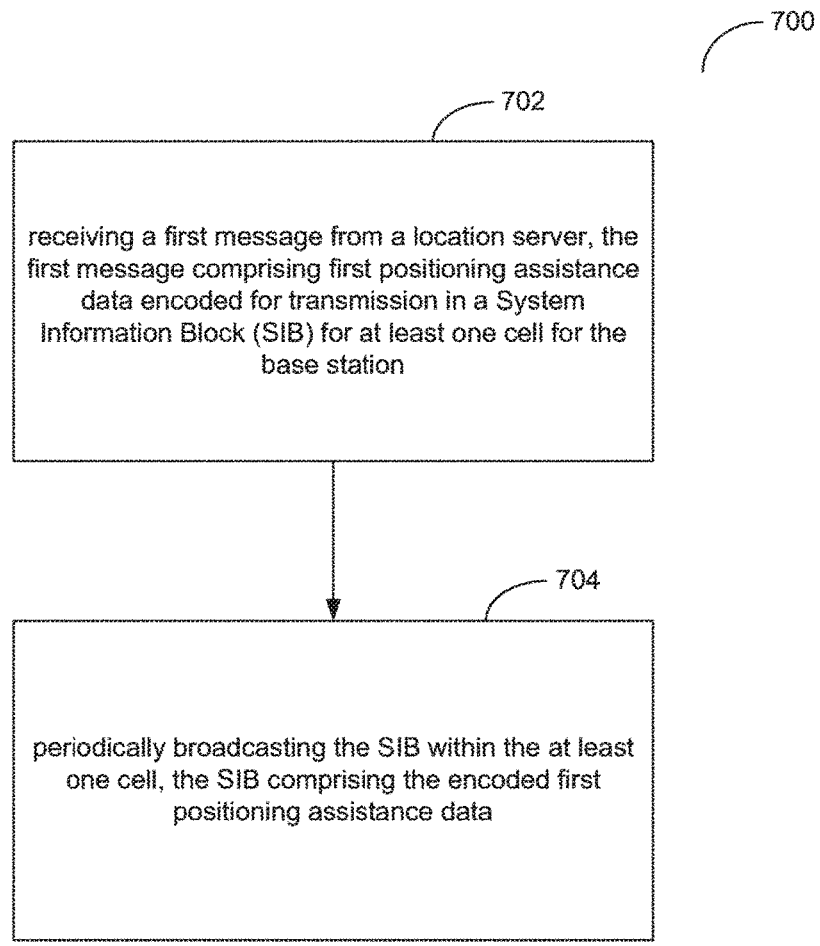

FIG. 7 is a flow diagram of a process 700 for broadcasting positioning assistance data (PAD) in a network that may be performed by a base station such as an eNB (e.g. eNB 104 or 106), a gNB (e.g. gNB 111) or an ng-eNB. Process 700 may start at block 702, which may comprise receiving a first message from a location server (e.g. an E-SMLC such as E-SMLC 110 or an LMF such as LMF 184), where the first message comprises first PAD (also referred to as location assistance data) encoded for transmission in a SIB for at least one cell for the base station. For example, block 702 may correspond to receiving one or more messages 410 in signaling flow 400 and/or may correspond to stage 2 of signaling flow 200 and/or to stage 1 of FIG. 3B. In an implementation, the SIB may comprise PAD specifically tailored to a particular cell for the base station.

Block 704 may comprise broadcasting the SIB within the at least one cell, where the SIB comprises the encoded first PAD received at block 702. Block 704 may correspond to broadcasting downlink messages 412 in signaling flow 400 and/or to broadcasting SIB messages using RRC for stage 3 of signaling flow 200. In an embodiment, block 704 may comprise broadcasting the SIB periodically.

In an aspect of process 700, the first message is received from the location server at block 702 according to an LTE Positioning Protocol A (LPPa) protocol, e.g. which may apply when the base station is an eNB. In another aspect, the first message is received from the location server at block 702 according to an NR Positioning Protocol A (NRPPa) protocol, e.g. which may apply when the base station is a gNB or ng-eNB.

In an aspect, the process 700 further comprises: receiving a second message from the location server requesting first resources for the transmission in the SIB; determining second resources for the transmission in the SIB, where the second resources comprise the first resources or a subset of the first resources; and sending a third message to the location server confirming the second resources. This aspect may be as described for FIG. 3A and/or messages 408 and 409 in signaling flow 400, In an aspect of process 700, the first PAD comprises assistance data for at least one position method. The at least one position method may comprise a position method supported by an LTE Positioning Protocol (LPP) or an NR Positioning Protocol (NPP) or by message types defined by the Radio Technical Commission for Maritime Services (RTCM). The encoding of the first PAD may be based on encoding for LPP, encoding for NPP or encoding for RTCM message types. In this aspect, the at least one position method may comprise UE assisted OTDOA for wideband LTE, UE assisted OTDOA for narrowband LTE (e.g. NB-IoT), UE based OTDOA for wideband LTE, UE based OTDOA for narrowband LTE, UE assisted OTDOA for NR, UE based OTDOA for NR, UE based A-GNSS, UE assisted A-GNSS, UE assisted RTK, UE based RTK, UE assisted Precise Point Positioning (PPP), or UE Based PPP.

In another aspect of process 700, the encoded first PAD received at block 702 is ciphered (e.g. by the location server) based on a ciphering key, where the first message comprises an indication of ciphering. In this aspect, process 700 may further comprise broadcasting (e.g. periodically broadcasting) the SIB within the at least one cell at block 704, where the SIB comprises the ciphered and encoded first PAD and the indication of ciphering. In this aspect, the indication of ciphering may comprises an identifier for the ciphering key.

In another aspect of process 700, the first message comprises the SIB for the least one cell, and the SIB comprises the encoded first PAD, where the SIB is encoded by the location server. In this aspect, process 700 may further comprise periodically broadcasting the encoded SIB within the at least one cell. This aspect may correspond to Formatting Alternative 1 as described previously in association with signaling flow 200.

In an aspect, the first PAD may be received at block 702 unciphered and may then be ciphered by the base station before broadcast at block 704 based on a ciphering key. In this aspect, the SIB for the at least one cell may be broadcast (e.g. periodically) at block 704, where the SIB comprises the encoded and ciphered first PAD and an indication of ciphering. In this aspect, the indication of ciphering may comprise an identity for the ciphering key. In this aspect, information for the ciphering key (e.g. ciphering key parameters) may be sent to a network node (e.g. the MME 108 or AMF 182) or may be sent (e.g. using LPPa or NRPPa) to a location server (e.g. the E-SMLC 110 or LMF 184), where the location server forwards the information for the ciphering key to the network node. In this aspect, the information for the ciphering key may comprise a ciphering key value, a ciphering key identifier, an indication of the SIB, a time of applicability, a geographic area of applicability, or a combination thereof.

In another aspect, process 700 may further comprise receiving a second message from the location server, where the second message comprises second PAD encoded for transmission in the SIB for the at least one cell for the base station. This aspect may additionally comprise ceasing (e.g. periodic) broadcasting of the SIB within the least one cell, where the SIB comprises the encoded first PAD, and broadcasting (e.g. periodically) the SIB within the at least one cell, where the SIB comprises the encoded second PAD.

In another aspect, process 700 may further comprise segmenting the encoded first PAD into a plurality of encoded PAD segments; and (e.g. periodically) broadcasting the SIB within the at least one cell, where the SIB comprises at least one (e.g. exactly one) of the encoded first PAD segments of the plurality and segmentation information. In this aspect, the segmentation information may comprise an indication of segmentation, a segment number, an indication of a final segment or some combination thereof. This aspect may correspond to octet string segmentation (Segmentation Option 1) as described previously for signaling flow 2.

In another aspect of process 700, the first message may comprise a plurality of first PAD segments encoded (e.g. by the location server) for transmission in the SIB for the at least one cell for the base station. In this aspect, process 700 may additionally comprise (e.g. periodically) broadcasting the SIB within the at least one cell, where the SIB comprises at least one (e.g. just one) of the encoded first PAD segments of the plurality. This aspect may correspond to pseudo-segmentation (Segmentation Option 2) as described previously for signaling flow 2.

In a further aspect of process 700, the first message received at block 702 may comprise a plurality of SIB segments, where each SIB segment of the plurality comprises a segment of the first PAD encoded (e.g. by the location server) for transmission in the SIB for the at least one cell for the base station. In this aspect, process 700 may further comprise (e.g. periodically) broadcasting the SIB within the at least one cell, where the SIB comprises at least one (e.g. exactly one) of the SIB segments of the plurality. This aspect may correspond to either octet string segmentation (Segmentation Option 1) or pseudo-segmentation (Segmentation Option 2) as described previously for signaling flow 2 where Formatting Alternative 1 described previously for signaling flow 2 is also used.

In another aspect, process 700 may further comprise broadcasting scheduling information (e.g. in a SIB1), where the scheduling information comprises a periodicity for the SIB, a content of the SIB, a ciphering indication for the SIB, or a combination thereof.

In an aspect of process 700, the first PAD may be encoded based on LPP or based on NPP. In a further embodiment, the first PAD may be encoded based on message types defined by RTCM.

Figure 8:
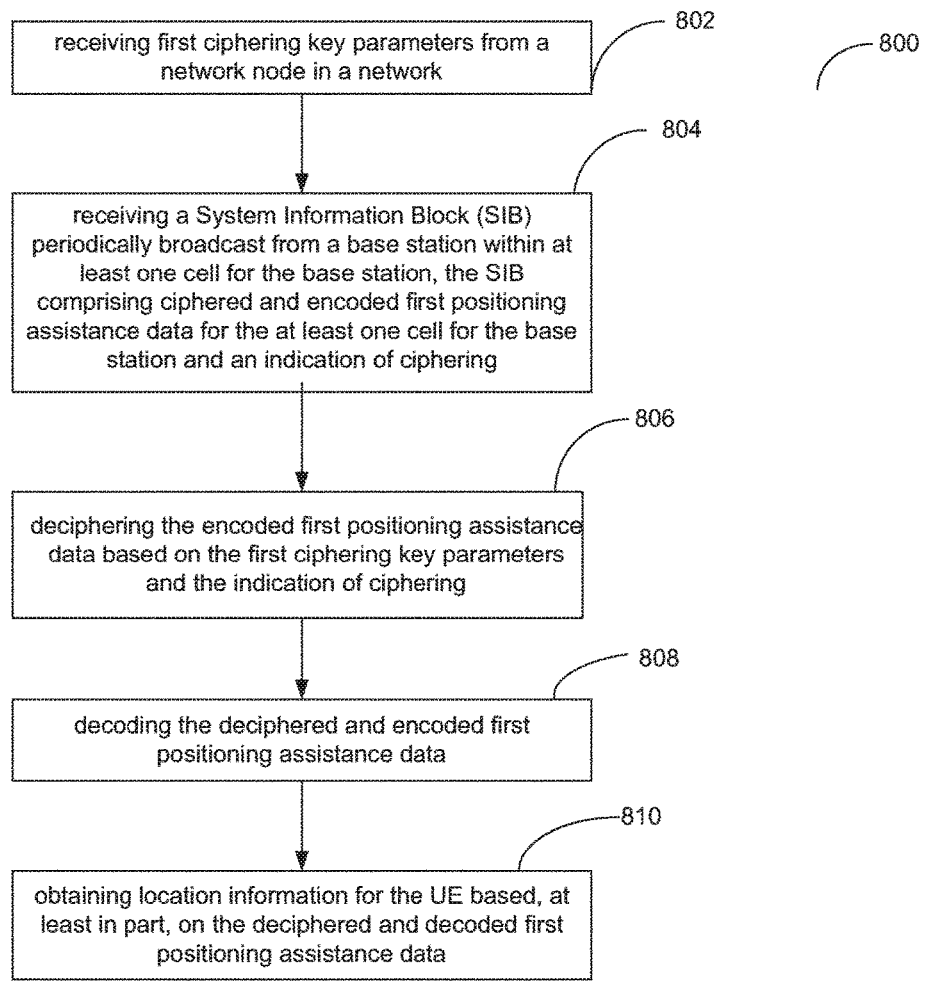

FIG. 8 is a flow diagram of a process 800 for broadcasting positioning assistance data in a network that may be performed at a UE such as UE 102. Process 800 may start at block 802, which may comprise receiving first ciphering key parameters from a network node in a network (e.g. as for MM procedure 422 in signaling flow 400 and/or as at stage 5 in signaling flow 200). Block 804 may comprise receiving a System Information Block (SIB) broadcasted (e.g. periodically) from a base station (e.g. eNB 104 or 106, a gNB 111 or an ng-eNB) within at least one cell for the base station, where the SIB comprises ciphered and encoded first positioning assistance data (PAD) for the at least one cell for the base station and an indication of ciphering. The at least one cell for the base station may be a serving cell for the UE in one aspect. Block 804 may correspond to receiving one or more messages 412 in signaling flow 400 and/or to receiving one or more SIB messages according to stage 3 of signaling flow 200. The first PAD may be tailored for the at least one cell.

Block 806 may comprise deciphering the encoded first positioning assistance data based on the first ciphering key parameters and the indication of ciphering.

Block 808 may comprise decoding the deciphered and encoded first PAD. Block 810 may comprise obtaining location information for the UE based, at least in part, on the deciphered and decoded first PAD obtained at block 808. For example, Block 810 may comprise obtaining location measurements or a location estimate for the UE as exemplified by block 540 in FIG. 5.

In one aspect of process 800, the first positioning assistance data comprises positioning assistance data for at least one position method. The at least one position method may comprise a position method supported by the LTE Positioning Protocol (LPP), an NR Positioning Protocol (NPP) or by message types defined by Radio Technical Commission for Maritime Services (RTCM). In this aspect, the encoding of the first PAD may be based on encoding for LPP, encoding for NPP or encoding for RTCM message types. In this aspect, the at least one position method may comprise UE-assisted OTDOA for wideband LTE, UE-assisted OTDOA for narrowband LTE (e.g. NB-IoT), UE-based OTDOA for wideband LTE, UE-based OTDOA for narrowband LTE, UE-assisted OTDOA for NR, UE-based OTDOA for NR, UE-based A-GNSS, UE-assisted A-GNSS, UE-assisted RTK, UE-based RTK, UE assisted Precise Point Positioning (PPP) or UE based PPP. In this aspect, the location information obtained at block 810 may comprises location measurements for the at least one position method or a location estimate for the UE based on the at least one position method, or a combination thereof.

In another aspect of the process 800, the network node comprises an MME (e.g. MME 108) or an AMF (e.g. AMF 182) and receiving the first ciphering key parameters at block 802 may comprise receiving the first ciphering key parameters using a Mobility Management (MM) procedure. In this aspect, the MM procedure may comprise an Attach procedure, a Tracking Area Update procedure, a Service Request procedure or a Registration procedure. Further, the MM procedure may use a Non-Access Stratum protocol—e.g. as defined for LTE access to an eNB in 3GPP TS 24.301 or as defined for LTE access to an ng-eNB or NR access to a gNB according to procedures in 3GPP 23.502. In this aspect, and as described previously in association with MM procedure 422 for signaling flow 400, process 800 may further comprise sending a first message for the MM procedure to the network node, where the first message requests the first ciphering key parameters, and receiving a second message for the MM procedure from the network node, where the second message comprises the first ciphering key parameters. In this aspect, process 800 may also further comprise receiving second ciphering key parameters (e.g. from an MME such as MME 108 or an AMF such as AMF 182), where the second ciphering key parameters comprise at least one of a time of applicability and a geographic area of applicability, and where sending the first message requesting the first ciphering key parameters is in response to one of an expiration of the time of applicability or movement of the UE outside the geographic area of applicability.

In another aspect of process 800, the first ciphering key parameters may comprise a ciphering key value, a ciphering key identifier, a time of applicability, an indication of the SIB, or a geographic area of applicability, or a combination thereof. In this aspect the time of applicability may comprise a start time, an end time or a duration, or a combination thereof. In this aspect, the geographic area of applicability may comprise the at least one cell for the base station, at least one location area for the network, at least one tracking area for the network, or at least one geographic area defined using coordinates (e.g. latitude and longitude coordinates). In this aspect, the indication of ciphering may comprise the ciphering key identifier.

A further aspect of process 800 may comprise receiving from the base station second positioning assistance data (PAD) ciphered and encoded in the SIB, where the second positioning assistance data is different from the first positioning assistance data. This aspect may also comprise deciphering and decoding the second positioning assistance data, ceasing application of the first positioning assistance data; and obtaining the location information for the UE based, at least in part, on the deciphered and decoded second positioning assistance data.

In another aspect of process 800, the SIB (e.g. periodically) broadcast from the base station is segmented (e.g. by the base station or by a location server) according to a segmentation option. In this aspect, the segmentation option may comprises octet string segmentation (e.g. as described previously for signaling flow 200), and process 800 may then further comprise receiving all the segments of the SIB broadcast (e.g. periodically) from the base station and reassembling the SIB prior to the deciphering at block 806 and the decoding at block 808. In this aspect, the segmentation option may alternatively comprise pseudo-segmentation with independent ciphering of each SIB segment (e.g. as described previously for signaling flow 200), and process 800 may then further comprise receiving each segment of the SIB broadcast (e.g. periodically) from the base station, and deciphering (at block 806) and decoding (at block 808) the each segment independently of other segments of the SIB. In this aspect, the segmentation option may instead comprise pseudo-segmentation with dependent ciphering of each SIB segment (e.g. as described previously for signaling flow 200), and process 800 may then further comprise receiving each segment of the SIB broadcast (e.g. periodically) from the base station starting with the first segment, and deciphering and decoding the each segment independently of later segments of the SIB.

In another aspect, process 800 may further comprise receiving scheduling information (e.g. in a SIB1 message) periodically broadcast from the base station, where the scheduling information comprises a periodicity for the SIB, a content of the SIB, an indication of ciphering for the SIB, or a combination thereof, and determining whether to receive the SIB at block 804, based at least in part, on the scheduling information.

In another aspect of process 800, the first PAD may be encoded based on LPP or NPP or encoding for RTCM message types, for example.

Figure 9:
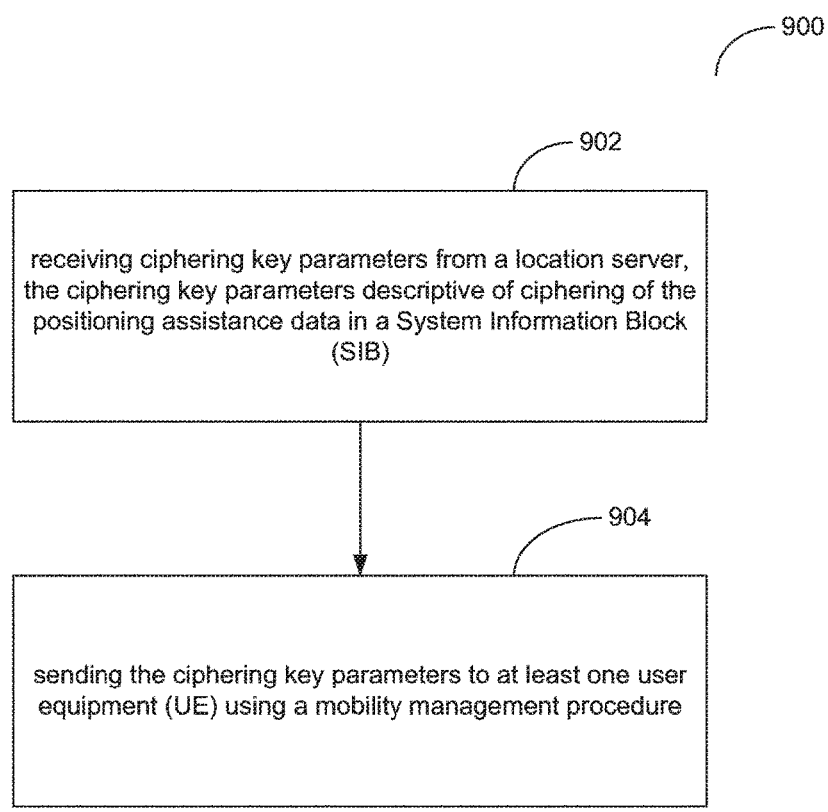

FIG. 9 is a flow diagram of a process 900 for broadcasting positioning assistance data in a network that may be performed at a network node such as an MME (e.g. MME 108) or an AMF (e.g. AMF 182). Process 900 may start at block 902 which may comprise receiving ciphering key parameters from a location server (e.g. an E-SMLC 110 or LMF 184), where the ciphering key parameters are descriptive of ciphering of the positioning assistance data in a System Information Block (SIB). For example, the ciphering key parameters may be received in a message for LCS-AP (e.g. when the network node is an MME). Block 902 may correspond to stage 4 in signaling flow 200 and/or to receiving message 420 in signaling flow 400. Block 904 in process 900 may comprise sending the ciphering key parameters received at block 902 to at least one UE such as UE 102, for example using a Mobility Management Procedure. Block 904 may correspond to stage 5 in signaling flow 200 and/or to MM procedure 422 in signaling flow 400.

In an aspect, the Mobility Management procedure for block 904 comprises an Attach procedure, a Tracking Area Update procedure, a Service Request procedure or a Registration procedure.

In an aspect, the ciphering key parameters received at block 902 comprise a ciphering key value, a ciphering key identifier, a time of applicability, an indication of the SIB, a geographic area of applicability, or a combination thereof. In this aspect, the time of applicability may comprise a start time, an end time, a duration, or a combination thereof. In this aspect, the geographic area of applicability may comprise at least one cell for the network, at least one location area for the network, at least one tracking area for the network, or at least one geographic area defined using coordinates (e.g. latitude and longitude coordinates).

In another aspect, process 900 further comprises receiving a first message for the mobility management procedure from the at least one UE, where the first message requests the ciphering key parameters, and sending a second message for the mobility management procedure to the at least one UE, where the second message comprises the ciphering key parameters. In this aspect, the first message may be for a Non-Access Stratum (NAS) Protocol and may comprise an Attach Request, a Tracking Area Update (TAU) Request, a Service Request, or a Registration Request. In this aspect, the second message may comprise a NAS Attach Accept, a NAS TAU Accept or a NAS Registration Accept message.

In a further aspect of process 900, sending the ciphering key parameters to the at least one UE at block 904 is based on a subscription of the at least one UE to receiving ciphering key parameters (e.g. subscription stored in an HSS such as HSS 145 or a UDM such as UDM 188).

Subject matter shown in FIGS. 6-9 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "UE," "location server," and/or similar terms; however, if it is determined, for some reason not immediately apparent, that the foregoing understanding cannot stand and that 35 USC § 112(f) therefore, necessarily is implicated by the use of the term "computing device," "UE," "location server," and/or similar terms, then, it is intended, pursuant to that statutory section, that corresponding structure, material and/or acts for performing one or more functions be understood and be interpreted to be described at least in FIGS. 2-9, and corresponding text of the present disclosure.

Figure 10:
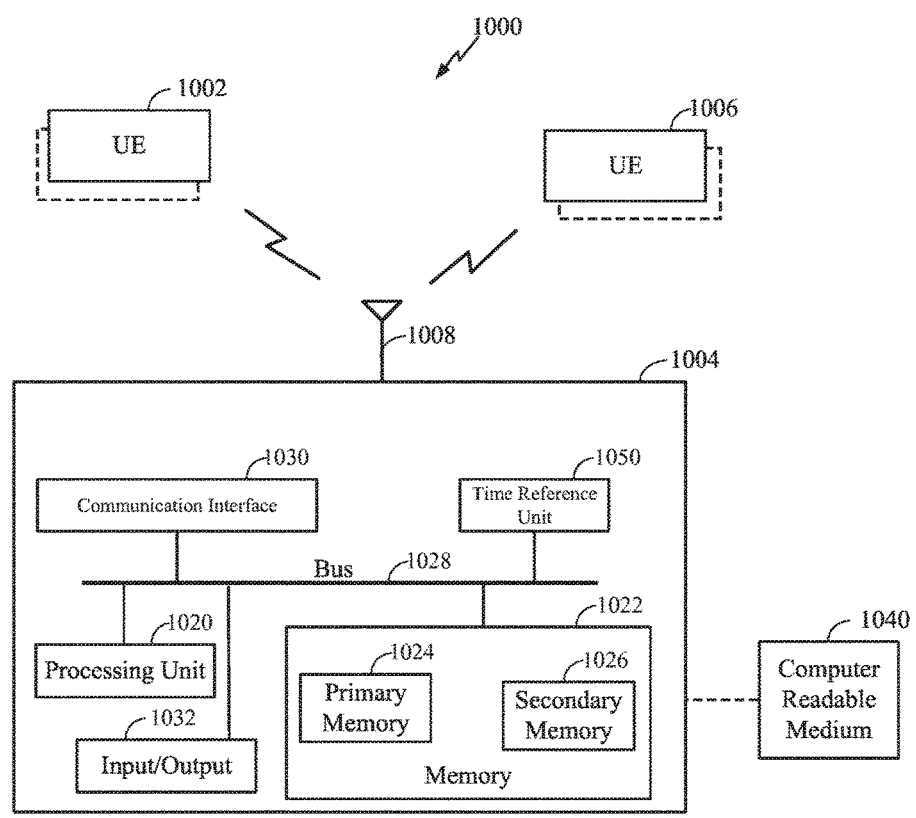
FIG. 10 is a schematic block diagram depicting an example wireless communication system including a plurality of computing platforms comprising one or more wirelessly connected devices, in accordance with an implementation.

FIG. 10 is a schematic diagram illustrating an example system 1000 that may include one or more devices configurable to implement techniques or processes described above, for example, in connection with FIGS. 1A-9. System 1000 may include, for example, a first device 1002, a second device 1004, and a third device 1006, which may be operatively coupled together through a wireless communications network (e.g. E-UTRAN 120 and EPC 130 of communication system 100 or NG-RAN 135 and 5GC 180 of communication system 101). In an aspect, first device 1002 may comprise a UE as shown, for example, such as UE 102 in FIGS. 1A, 1B, 2, 3A-3D, 4 and 5. Second device 1004 may comprise a node in a cellular/wireless communication network such as a base station or access point. For example second device 1004 may correspond to eNB 104 or 106, a gNB 111 or an ng-eNB for FIGS. 1A-4. Third device 1006 may comprise another UE.

First device 1002, second device 1004 and third device 1006, as shown in FIG. 10, may be representative of any device, appliance or machine that may be configurable to exchange data over a wireless communications network. By way of example but not limitation, any of first device 1002, second device 1004, or third device 1006 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; wireless telecommunications access terminal; or any combination thereof. Any of the first, second, and third devices 1002, 1004, and 1006, respectively, may comprise one or more of an access point or a mobile device in accordance with the examples described herein.

Similarly, a wireless communications network, as shown in FIG. 10, is representative of one or more communication links, processes, or resources configurable to support the exchange of signaling and/or data between at least two of first device 1002, second device 1004, and third device 1006. By way of example but not limitation, a wireless communications network may include wireless or wired communication links, telephone or telecommunications systems (e.g., LTE), data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1006, there may be additional like devices operatively coupled to system 1000.

It is recognized that all or part of the various devices and networks shown in FIG. 10, and the processes and methods as further described herein, may be implemented using or otherwise including hardware, firmware, software, or any combination thereof.

Thus, by way of example but not limitation, second device 1004 may include at least one processing unit 1020 that is operatively coupled to a memory 1022 through a bus 1028.

Processing unit 1020 is representative of one or more circuits configurable to perform at least a portion of a data computing procedure or process. By way of example but not limitation, processing unit 1020 may include one or more processors, controllers, microprocessors, microcontrollers, application specific integrated circuits, digital signal processors, programmable logic devices, field programmable gate arrays, and the like, or any combination thereof.

Memory 1022 is representative of any data storage mechanism. Memory 1022 may include, for example, a primary memory 1024 or a secondary memory 1026. Primary memory 1024 may include, for example, a random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory 1024 or one or more data storage devices or systems, such as, for example, a disk drive, an optical disc drive, a tape drive, a solid state memory drive, etc. In certain implementations, secondary memory 1026 may be operatively receptive of, or otherwise configurable to couple to, a computer-readable medium 1040. Computer-readable medium 1040 may include, for example, any non-transitory medium that can carry or make accessible data, code or instructions for one or more of the devices in system 1000. Computer-readable medium 1040 may also be referred to as a storage medium.

Second device 1004 may include, for example, a communication interface 1030 that provides for or otherwise supports the operative coupling of second device 1004 to a wireless communications network at least through an antenna 1008. By way of example but not limitation, communication interface 1030 may include a network interface device or card, a modem, a router, a switch, a transceiver, and the like. In a particular implementation, communication interface 1030 may comprise a wireless transmitter that is configured for transmission of a PRS and/or broadcast of a SIB. Communication interface 1030 may further comprise a wireless receiver that is configured for reception, acquisition and/or measurement of a PRS and/or reception and acquisition of a SIB. Communication interface 1030 (or a different communication interface for second device 1004 not shown in FIG. 10) may further support the operative coupling of second device 1004 to a wireline communications network and/or to wired communication links that may enable second device 1004 to communicate with one or more other elements such as MME 108, E-SMLC 110, AMF 182 or LMF 184 as shown in FIGS. 1A-5.

Second device 1004 may include, for example, an input/output device 1032. Input/output device 1032 is representative of one or more devices or features that may be configurable to accept or otherwise introduce human or machine inputs, or one or more devices or features that may be configurable to deliver or otherwise provide for human or machine outputs. By way of example but not limitation, input/output device 1032 may include an operatively configured display, speaker, keyboard, mouse, trackball, touch screen, data port, etc.

Second device 1004 may further include a time reference unit 1050 that may be configured to determine an accurate global or common time by means of access to an accurate global time source, which may be provided in one embodiment by GNSS navigation signals received at antenna 1008 and acquired, measured and/or demodulated by communication interface 1030. Time reference unit 1050 may be used by second device 1004 (e.g. by communication interface 1030) to synchronize a SIB message broadcast by communication interface 1030 using antenna 1008 to the accurate global or common time and/or to receive a SIB message by communication interface 1030 using antenna 1008 at a known scheduling time.

In a particular implementation, all or portions of actions or operations set forth for process 700 may be executed by processing unit 1020 based on machine-readable instructions stored in memory 1022. For example processing unit 1020 may exchange control signaling with other entities using communication interface 1030 in order to support actions of blocks 702 and 704.

Figure 11:
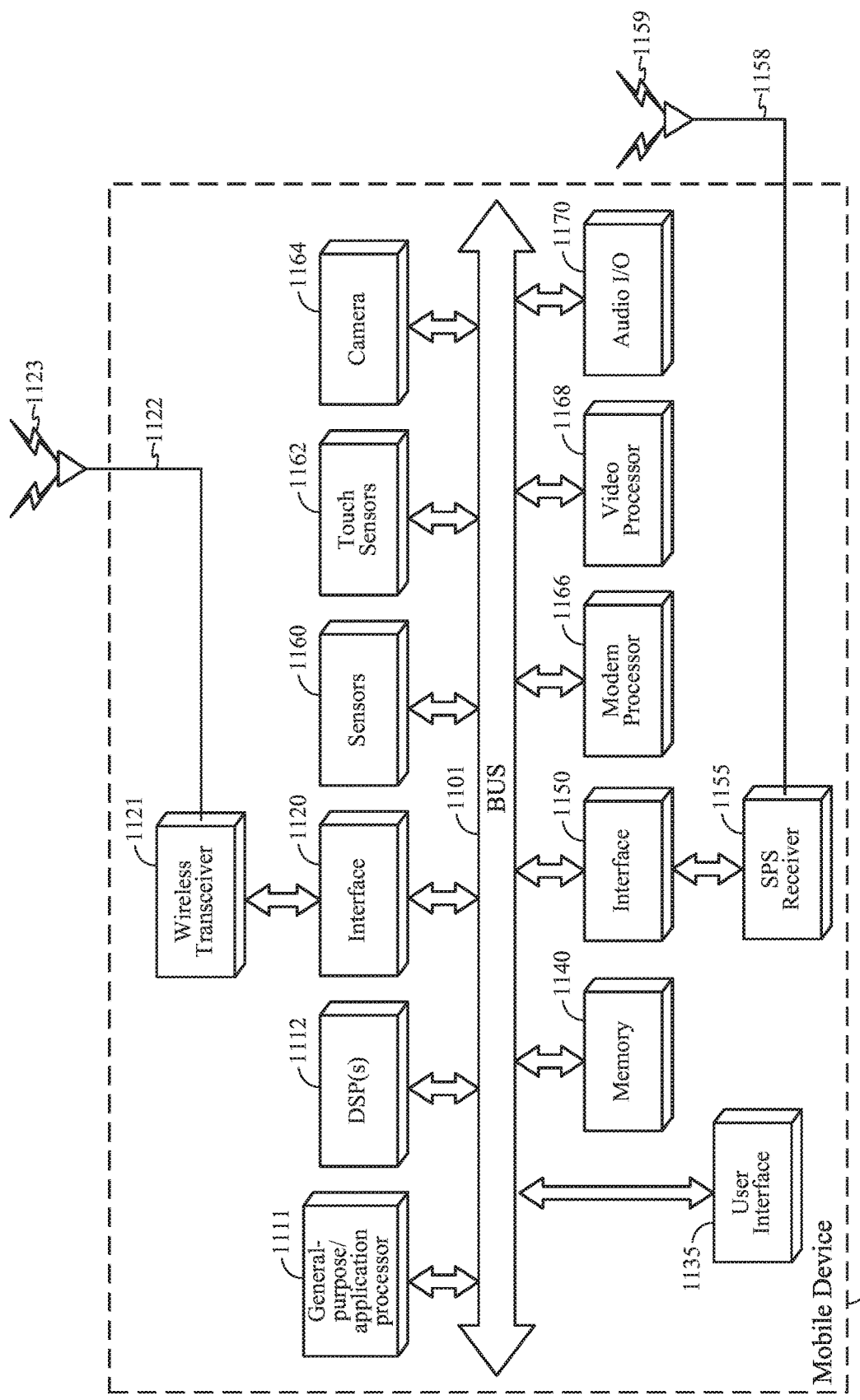
FIG. 11 is a schematic block diagram of a mobile device, in accordance with an example implementation.

FIG. 11 is a schematic diagram of a mobile device 1100 according to an embodiment. UE 102 as shown in FIGS. 1A-5 may comprise one or more features of mobile device 1100 shown in FIG. 11. In certain embodiments, mobile device 1100 may comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 1121 may receive and acquire a downlink signal comprising a SIB broadcast by a base station (e.g. eNB 104 or gNB 111), where the SIB comprises encoded and optionally ciphered PAD. In addition, wireless transceiver 1121 may process an acquired terrestrial positioning signal sufficiently to enable detection of timing of the acquired terrestrial positioning signal.

Mobile device 1100 may also comprise SPS receiver 1155 capable of receiving and acquiring SPS signals 1159 via SPS antenna 1158 (which may be the same as antenna 1122 in some embodiments). SPS receiver 1155 may also process, in whole or in part, acquired SPS signals 1159 for estimating a location of mobile device 1100. In some embodiments, general-purpose processor(s) 1111, memory 1140, digital signal processor(s) (DSP(s)) 1112 and/or specialized processors (not shown) may also be utilized to process acquired SPS signals, in whole or in part, and/or calculate an estimated location of mobile device 1100, in conjunction with SPS receiver 1155. Storage of SPS and terrestrial signals (e.g., signals acquired from wireless transceiver 1121 and signals conveying a SIB) or storage of measurements of these signals for use in performing positioning operations may be performed in memory 1140 or registers (not shown).

General-purpose processor(s) 1111, memory 1140, DSP(s) 1112 and/or specialized processors may provide or support a location engine for use in processing measurements to estimate a location of mobile device 1100. In a particular implementation, all or portions of actions or operations set forth for process 800 may be executed by general-purpose processor(s) 1111 or DSP(s) 1112 based on machine-readable instructions stored in memory 1140. For example general-purpose processor(s) 1111 or DSP(s) 1112 may process a downlink signal acquired by wireless transceiver 1121 to, for example, make measurements of RSSI, RTT, RSTD, RSRP and/or RSRQ, and/or to obtain, decode and optionally decipher PAD broadcast in a SIB.

Also shown in FIG. 11, digital signal processor(s) (DSP(s)) 1112 and general-purpose processor(s) 1111 may be connected to memory 1140 through bus 1101. A particular bus interface (not shown) may be integrated with the DSP(s) 1112, general-purpose processor(s) 1111 and memory 1140. In various embodiments, functions may be performed in response to execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 11, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) 1112 or general purpose application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 12:
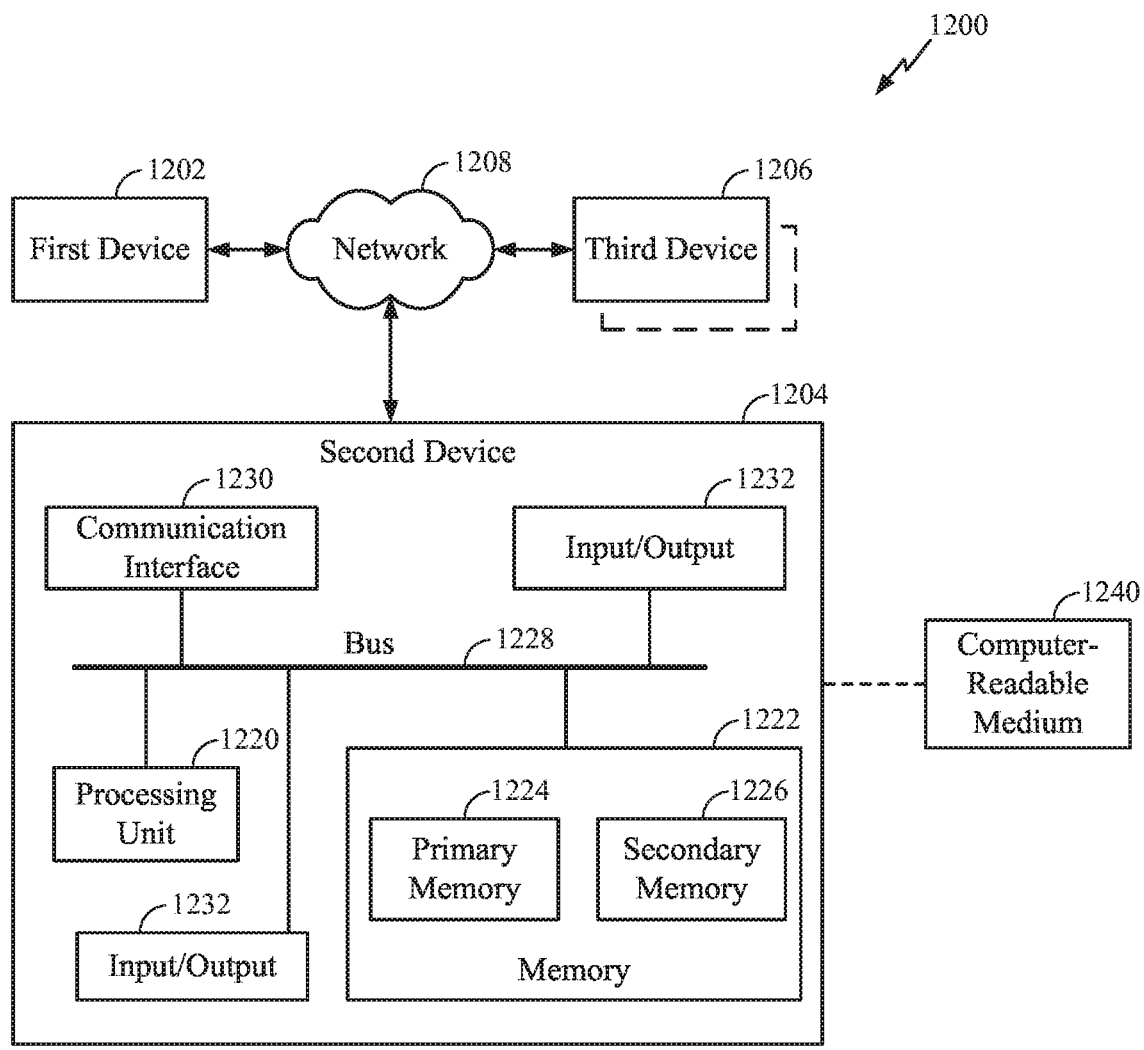
FIG. 12 is a schematic block diagram of an example computing platform in accordance with an implementation.

FIG. 12 is a schematic diagram illustrating an example system 1200 that may include one or more devices configurable to implement techniques or processes described above. System 1200 may include, for example, a first device 1202, a second device 1204, and a third device 1206, which may be operatively coupled together through a wireless communications network 1208. For example, wireless communications network 1208 may correspond to E-UTRAN 120 and EPC 130 in communication system 100 or to NG-RAN 135 and 5GC 180 in communication system 101. In an aspect, second device 1204 may comprise a network node such as MME 108 or AMF 182, or may comprise a location server such as E-SMLC 110 or LMF 184, as shown and described for FIGS. 1A-5. Also, in an aspect, wireless communications network 1208 may comprise one or more wireless access points, for example. However, claimed subject matter is not limited in scope in these respects.

First device 1202, second device 1204 and third device 1206 may be representative of any device, appliance or machine. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a location server, a network node, a base station almanac server, a location server function, a base station, or a mobile device in accordance with the examples described herein.

Similarly, wireless communications network 1208, may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, PAD may be stored in a particular format in memory 1222. Processing unit 1220 may execute instructions to encode, decode, cipher and/or decipher the PAD, e.g. using ciphering keys and other ciphering related information stored in memory 1222 in the case of ciphering or deciphering.

Secondary memory 1226 may include, for example, the same or similar type of memory as primary memory 1224 or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1230 that provides for or otherwise supports the operative coupling of second device 1204 to at least wireless communications network 1208. By way of example but not limitation, communication interface 1230 may include a network interface device or card, a modem, a router, a switch, a transceiver, and the like. Communication interface 1230 may support wireless and/or wireline communication of second device 1204 with wireless communications network 1208 and/or with first device 1202 and/or third device 1206.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

In a particular implementation, all or portions of actions or operations set forth for process 600 may be executed by processing unit 1220 based on machine-readable instructions stored in memory 1222. For example processing unit 1220 may exchange control signaling with other entities using communication interface 1230 in order to support actions of blocks 602, 604, 606 and 608.

In a particular implementation, all or portions of actions or operations set forth for process 900 may be executed by processing unit 1220 based on machine-readable instructions stored in memory 1222. For example processing unit 1220 may exchange control signaling with other entities using communication interface 1230 in order to support actions of blocks 902 and 904.

Particular embodiments described herein are directed to a method at a location server for broadcasting positioning assistance data in a network, comprising: obtaining location parameters for at least one cell in the network; determining the positioning assistance data based, at least in part, on the location parameters; encoding the positioning assistance data for transmission in a System Information Block (SIB) for the at least one cell; and sending the encoded positioning assistance data to a base station for the at least one cell, wherein the base station periodically broadcasts the SIB within the at least one cell, wherein the SIB comprises the encoded positioning assistance data. In one particular implementation, the base station comprises an evolved NodeB (eNB) for $3^{rd}$ Generation Partnership Project (3GPP) Long Term Evolution (LTE) or a New Radio (NR) NodeB (gNB) for 3GPP NR. Here, for example, sending the encoded positioning assistance data to the eNB may comprise sending the encoded positioning assistance data using an LTE Positioning Protocol A (LPPa) protocol or an NR Positioning Protocol A (NRPPa) protocol. In another particular implementation, the method further comprises sending a request to the base station requesting first resources for the transmission in the SIB; and receiving a response from the base station confirming second resources for the transmission in the SIB, wherein the second resources comprise the first resources or a subset of the first resources. In another particular implementation, the positioning assistance data comprises assistance data for at least one position method. Here, for example, the at least one position method may comprise a position method supported by an LTE Positioning Protocol (LPP) or an NR Positioning Protocol (NPP) or by message types defined by the Radio Technical Commission for Maritime Services (RTCM). Also, the encoding of the positioning assistance data may be based, at least in part, on encoding for LPP or encoding for NPP or encoding for RTCM message types. Also, the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematics (RTK), or UE based RTK, UE assisted Precise Point Positioning (PPP), or UE based PPP. In another particular implementation, sending the encoded positioning assistance data to the base station may be performed responsive to a change in at least one location parameter. In another particular implementation, the method further comprises: ciphering the encoded positioning assistance data based on a ciphering key; and sending the ciphered and encoded positioning assistance data and an indication of ciphering to the base station, wherein the base station periodically broadcasts the SIB within the at least one cell, wherein the SIB comprises the ciphered and encoded positioning assistance data and the indication of ciphering. For example, the indication of ciphering may comprise an identifier for the ciphering key. Also, the method may further comprise sending ciphering key parameters descriptive of the ciphering key to a network node, wherein the network node provides the ciphering key parameters to at least one user equipment (UE). Here, the network node may comprise a Mobility Management Entity (MME) or an Access and Mobility Management Function (AMF). Also, sending the ciphering key parameters to the MME may comprise sending the ciphering key parameters using a Location Services Application Protocol (LCS-AP). Also, the ciphering key parameters may comprise a ciphering key value, a ciphering key identifier, a time of applicability, an indication of the SIB or a geographic area of applicability, or a combination thereof. Here, the time of applicability may comprise a start time, an end time or a duration, or a combination thereof. Also, the geographic area of applicability comprises at least one cell for the network, at least one location area for the network or at least one tracking area for the network. In another particular implementation, the method further comprises: encoding the SIB for the at least one cell; wherein the encoded SIB comprises the encoded positioning assistance data; and sending the encoded SIB to the base station for the at least one cell, wherein the base station periodically broadcasts the encoded SIB within the at least one cell. In another particular implementation, obtaining the location parameters comprises receiving at least one location parameter from a base station, receiving at least one location parameter from a reference station for Real Time Kinematics (RTK), receiving at least one location parameter from an RTK network or receiving at least one location parameter from a Global Navigation Satellite System (GNSS) reference network, or some combination thereof. In another particular implementation, the positioning assistance data comprises positioning parameters for at least one cell nearby to the at least one cell. In another particular implementation the location server is an Enhanced Serving Mobile Location Center (E-SMLC) or a Location Management Function (LMF). In another particular implementation, the method further comprises: segmenting the positioning assistance data into a plurality of positioning assistance data segments;

encoding each positioning assistance data segment in the plurality for transmission in the SIB for the at least one cell; and sending the plurality of encoded positioning assistance data segments to the base station for the at least one cell, wherein the base station periodically broadcasts the SIB within the at least one cell, wherein the SIB comprises at least one of the encoded positioning assistance data segments of the plurality. In another particular implementation, the method further comprises: segmenting the encoded positioning assistance data into a plurality of encoded positioning assistance data segments; and sending the plurality of encoded positioning assistance data segments to the base station for the at least one cell, wherein the base station periodically broadcasts the SIB within the at least one cell, wherein the SIB comprises at least one of the encoded positioning assistance data segments of the plurality.

Particular embodiments described herein are also directed to a location server for broadcasting positioning assistance data in a network, comprising: a communication interface; and one or more processors configured to: obtain location parameters for at least one cell in the network; determine the positioning assistance data based, at least in part, on the location parameters; encode the positioning assistance data for transmission in a System Information Block (SIB) for the at least one cell; and send the encoded positioning assistance data to a base station for the at least one cell, wherein the base station periodically broadcasts the SIB within the at least one cell, wherein the SIB comprises the encoded positioning assistance data.

Particular embodiments described herein are also directed to a storage medium comprising computer readable instructions stored thereon which are executable by one or more processors of a location server to: obtain location parameters for at least one cell in the network; determine the positioning assistance data based, at least in part, on the location parameters; encode the positioning assistance data for transmission in a System Information Block (SIB) for the at least one cell; and send the encoded positioning assistance data to a base station for the at least one cell, wherein the base station periodically broadcasts the SIB within the at least one cell, wherein the SIB comprises the encoded positioning assistance data.

Particular embodiments are also directed to a location server for broadcasting positioning assistance data in a network, comprising: means for obtaining location parameters for at least one cell in the network; means for determining the positioning assistance data based, at least in part, on the location parameters; means for encoding the positioning assistance data for transmission in a System Information Block (SIB) for the at least one cell; and means for sending the encoded positioning assistance data to a base station for the at least one cell, wherein the base station periodically broadcasts the SIB within the at least one cell, wherein the SIB comprises the encoded positioning assistance data.

Particular embodiments described herein are also directed to a method at a base station for broadcasting positioning assistance data in a network, comprising: receiving a first message from a location server, the first message comprising first positioning assistance data encoded for transmission in a System Information Block (SIB) for at least one cell for the base station; and periodically broadcasting the SIB within the at least one cell, the SIB comprising the encoded first positioning assistance data. In one particular implementation, the base station comprises an evolved NodeB (eNB) for $3^{rd}$ Generation Partnership Project (3GPP) Long Term Evolution (LTE), a next generation eNB (ng-eNB) for a Next Generation Radio Access Network (NG-RAN), or a New Radio (NR) NodeB (gNB) for 3GPP NR. For example, the location server may comprise an Enhanced Serving Mobile Location Center (E-SMLC) or a Location Management Function (LMF). In another particular implementation, receiving the first message from the location server at the eNB comprises receiving the first message according to an LTE Positioning Protocol A (LPPa) protocol. In another particular implementation, receiving the first message from the location server at the gNB or the ng-eNB comprises receiving the first message according to an NR Positioning Protocol A (NRPPa) protocol. In another particular implementation, the method further comprises: receiving a second message from the location server requesting first resources for the transmission in the SIB; determining second resources for the transmission in the SIB, wherein the second resources comprise the first resources or a subset of the first resources; and sending a third message to the location server confirming the second resources. In another particular implementation, the first positioning assistance data comprises assistance data for at least one the at least one position method may comprise a position method supported by an LTE Positioning Protocol (LPP) or an NR Positioning Protocol (NPP) or by message types defined by the Radio Technical Commission for Maritime Services (RTCM). Also, the encoding of the first positioning assistance data may be based on encoding for LPP or encoding for NPP or encoding for RTCM message types. In another particular implementation, the at least one position method comprises User Equipment (UE) assisted Observed Time Difference of Arrival (OTDOA) for wideband LTE, UE assisted OTDOA for narrowband LTE, UE based OTDOA for wideband LTE, UE based OTDOA for narrowband LTE, UE assisted OTDOA for NR, UE based OTDOA for NR, UE based Assisted Global Navigation Satellite System (A-GNSS), UE assisted A-GNSS, UE assisted Real Time Kinematics (RTK), UE based RTK, UE assisted Precise Point Positioning (PPP), or UE Based PPP. In another particular implementation, the encoded first positioning assistance data is ciphered based on a ciphering key, wherein the first message comprises an indication of ciphering, the method further comprising: periodically broadcasting the SIB within the at least one cell, the SIB comprising the ciphered and encoded first positioning assistance data and the indication of ciphering. For example, the indication of ciphering may comprise an identifier for the ciphering key. In another particular implementation, the first message comprises the SIB for the least one cell, wherein the SIB comprises the encoded first positioning assistance data, wherein the SIB is encoded by the location server, and the method further comprises periodically broadcasting the encoded SIB within the at least one cell. In another particular implementation, the method further comprises: ciphering the first positioning assistance data encoded for transmission in the SIB based on a ciphering key; and periodically broadcasting the SIB within the at least one cell, wherein the SIB comprises the ciphered and encoded first positioning assistance data and an indication of ciphering. For example, the indication of ciphering may comprise an identifier of the ciphering key. Also, the method may further comprise sending ciphering key parameters descriptive of the ciphering key to a network node. Also, the network node may comprise the location server, a Mobility Management Entity (MME), or an Access and Mobility Management Function (AMF). Also, the ciphering key parameters may comprise a ciphering key value, a ciphering key identifier, a time of applicability, an indication of the SIB, or a geographic area of applicability, or a combination thereof. In another particular implementation, the method further comprises: receiving a second message from the location server, the second message comprising second positioning assistance data encoded for transmission in the SIB for the at least one cell for the base station; ceasing periodic broadcasting of the SIB within the least one cell, the SIB comprising the encoded first positioning assistance data; and periodically broadcasting the SIB within the at least one cell, the SIB comprising the encoded second positioning assistance data. In another particular implementation, the method further comprises: segmenting the encoded first positioning assistance data into a plurality of encoded positioning assistance data segments; and periodically broadcasting the SIB within the at least one cell, wherein the SIB comprises at least one of the encoded first positioning assistance data segments of the plurality and segmentation information. For example, the segmentation information may comprise an indication of segmentation, a segment number, an indication of a final segment or some combination thereof. In another particular implementation, the first message comprises a plurality of first positioning assistance data segments encoded for transmission in the SIB for the at least one cell for the base station; and the method further comprises periodically broadcasting the SIB within the at least one cell, wherein the SIB comprises at least one of the encoded first positioning assistance data segments of the plurality. In another particular implementation, the first message comprises a plurality of SIB segments, wherein each SIB segment of the plurality comprises a segment of the first positioning assistance data encoded for transmission in the SIB for the at least one cell for the base station; and the method further comprises periodically broadcasting the SIB within the at least one cell, wherein the SIB comprises at least one of the SIB segments of the plurality. In another particular implementation, the method further comprises: broadcasting scheduling information, wherein the scheduling information comprises a periodicity for the SIB, a content of the SIB, a ciphering indication for the SIB, or a combination thereof.

Particular embodiments described herein are also directed to a base station for broadcasting location assistance data in a network, comprising: a wireless transceiver device; and one or more processors configured to: receive a first message from a location server, the first message comprising first positioning assistance data encoded for transmission in a System Information Block (SIB) for at least one cell for the base station; and periodically broadcast the SIB within the at least one cell, the SIB comprising the encoded first positioning assistance data.

Particular embodiments described herein are also directed to a storage medium comprising computer readable instructions stored thereon which are executable by one or more processors at base station to: receive a first message from a location server, the first message comprising first positioning assistance data encoded for transmission in a System Information Block (SIB) for at least one cell for the base station; and periodically broadcast the SIB within the at least one cell, the SIB comprising the encoded first positioning assistance data.

Particular embodiments described herein are also directed to a base station for broadcasting positioning assistance data in a network, comprising: means for receiving a first message from a location server, the first message comprising first positioning assistance data encoded for transmission in a System Information Block (SIB) for at least one cell for the base station; and means for periodically broadcasting the SIB within the at least one cell, the SIB comprising the encoded first positioning assistance data.

Particular embodiments described herein are also directed to a method at a network node for broadcasting positioning assistance data in a network, comprising: receiving ciphering key parameters from a location server, the ciphering key parameters descriptive of ciphering of the positioning assistance data in a System Information Block (SIB); and sending the ciphering key parameters to at least one user equipment (UE) using a mobility management procedure. In a particular implementation, the network node is a Mobility Management Entity (MME) or an Access and Mobility Management Function (AMF). In another particular implementation, the location server is an Enhanced Serving Mobile Location Center (E-SMLC) or a Location Management Function (LMF). In another particular implementation, receiving the ciphering key parameters at the MME uses a Location Services Application Protocol (LCS-AP). In another particular implementation, the mobility management procedure comprises an Attach procedure, a Tracking Area Update procedure, a Service Request procedure or a Registration procedure. In another particular implementation, the method further comprise: receiving a first message for the mobility management procedure from the at least one UE, the first message requesting the ciphering key parameters; and sending a second message for the mobility management procedure to the at least one UE, the second message comprising the ciphering key parameters. For example, the first message may comprise an Attach Request, a Tracking Area Update (TAU) Request, a Service Request, or a Registration Request for a Non-Access Stratum (NAS) Protocol, wherein the second message comprises a NAS Attach Accept, a NAS TAU Accept or a NAS Registration Accept message. In another particular implementation, sending the ciphering key parameters to the at least one UE is based on a subscription of the at least one UE. In another particular implementation, the ciphering key parameters comprise a ciphering key value, a ciphering key identifier, a time of applicability, an indication of the SIB, or a geographic area of applicability, or a combination thereof. For example, the time of applicability may comprise a start time, an end time, or a duration, or a combination thereof. Also, the geographic area of applicability may comprise at least one cell for the network, at least one location area for the network, at least one tracking area for the network, or at least one geographic area defined using coordinates.

Particular embodiments described herein are also directed to a network node for broadcasting positioning assistance data in a network, comprising: a communication interface; and one or more processors configured to: receive ciphering key parameters from a location server, the ciphering key parameters descriptive of ciphering of the positioning assistance data in a System Information Block (SIB); and send the ciphering key parameters to at least one user equipment (UE) using a mobility management procedure.

Particular embodiments described herein are also directed to a storage medium comprising computer readable instructions stored thereon which are executable by one or more processors of a network node to:
receive ciphering key parameters from a location server, the ciphering key parameters descriptive of ciphering of the positioning assistance data in a System Information Block (SIB); and send the ciphering key parameters to at least one user equipment (UE) using a mobility management procedure.

Particular embodiments described herein are also directed to a network node for broadcasting positioning assistance data in a network, comprising: means for receiving ciphering key parameters from a location server, the ciphering key parameters descriptive of ciphering of the positioning assistance data in a System Information Block (SIB); and means for sending the ciphering key parameters to at least one user equipment (UE) using a mobility management procedure.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method at a user equipment (UE), comprising:
    requesting ciphering key parameters in response to expiration of a time of applicability of ciphering key information or the UE leaving a geographic area of applicability of the ciphering key information or receipt, by the UE, of ciphered positioning assistance data for which the UE lacks corresponding ciphering key information;
    receiving, at the UE in response to the requesting, first ciphering key parameters from a network node in a network during a mobility management procedure;
    receiving, at the UE, a System Information Block (SIB) periodically broadcast from a base station within at least one cell for the base station, the SIB comprising ciphered and encoded first positioning assistance data for the at least one cell for the base station, and an indication of ciphering;
    deciphering, at the UE, the encoded first positioning assistance data based, at least in part, on the first ciphering key parameters and the indication of ciphering;
    decoding, at the UE, the deciphered and encoded first positioning assistance data; and
    determining, at the UE, location information for the UE based, at least in part, on the deciphered and decoded first positioning assistance data.

2. The method of claim 1, wherein the base station comprises a New Radio (NR) NodeB (gNB) for 3GPP NR, or a next generation eNB (ng-eNB) for a Next Generation Radio Access Network (NG-RAN).

3. The method of claim 2, wherein the first positioning assistance data comprises positioning assistance data for at least one position method.

4. The method of claim 3, wherein the at least one position method comprises a position method supported by an NR Positioning Protocol (NPP) or by message types defined by Radio Technical Commission for Maritime Services (RTCM).

5. The method of claim 4, wherein encoding of positioning assistance data is based on encoding for NPP or encoding for RTCM message types.

6. The method of claim 4, wherein the at least one position method comprises UE-assisted OTDOA for NR, UE-based OTDOA for NR, UE-Based Assisted Global Navigation Satellite System (A-GNSS), UE-Assisted A-GNSS, UE-Assisted Real Time Kinematics (RTK), UE-Based RTK, UE Assisted Precise Point Positioning (PPP) or UE Based PPP or combination thereof.

7. The method of claim 3, wherein the location information comprises location measurements for the at least one position method or a location estimate for the UE based on the at least one position method, or a combination thereof.

8. The method of claim 1, wherein the network node comprises a Mobility Management Entity (MME) or an Access and Mobility Management Function (AMF), and wherein receiving the first ciphering key parameters comprises receiving the first ciphering key parameters from the Mobility Management Entity (MME) or the Access and Mobility Management Function (AMF) using the Mobility Management (MM) procedure.

9. The method of claim 8, wherein the MM procedure comprises an Attach procedure, a Tracking Area Update procedure, a Service Request procedure or a Registration procedure.

10. The method of claim 8, wherein the MME or the AMF use a Non-Access Stratum protocol for performing the mobility management procedure with the UE.

11. The method of claim 1, wherein the first ciphering key parameters comprise a ciphering key value, a ciphering key identifier, a time of applicability, an indication of the SIB or a geographic area of applicability, or a combination thereof.

12. The method of claim 11, wherein the time of applicability comprises a start time, an end time or a duration, or a combination thereof.

13. The method of claim 11, wherein the geographic area of applicability comprises the at least one cell for the base station, at least one location area for the network, at least one tracking area for the network or at least one geographic area defined using coordinates.

14. The method of claim 1, and further comprising:
    receiving from the base station second positioning assistance data ciphered and encoded in the SIB, wherein the second positioning assistance data is different from the first positioning assistance data;
    deciphering and decoding the second positioning assistance data;
    ceasing application of the first positioning assistance data; and
    obtaining the location information for the UE based, at least in part, on the deciphered and decoded second positioning assistance data.

15. The method of claim 1, wherein the at least one cell for the base station comprises a serving cell for the UE.

16. The method of claim 1, wherein the SIB periodically broadcast from the base station is segmented according to a segmentation option.

17. The method of claim 16, wherein the segmentation option comprises octet string segmentation, and further comprising:
    receiving all segments of the SIB periodically broadcast from the base station and reassembling the SIB prior to the deciphering and the decoding.

18. The method of claim 16, wherein the segmentation option comprises pseudo-segmentation with independent ciphering of each SIB segment, and further comprising:
receiving each segment of the SIB periodically broadcast from the base station; and
deciphering and decoding each segment independently of other segments of the SIB.

19. The method of claim 16, wherein the segmentation option comprises pseudo-segmentation with dependent ciphering of each SIB segment, and further comprising:
receiving each segment of the SIB periodically broadcast from the base station starting with a first segment; and
deciphering and decoding each segment independently of later segments of the SIB.

20. The method of claim 1, and further comprising:
receiving scheduling information periodically broadcast from the base station, wherein the scheduling information comprises a periodicity for the SIB, a content of the SIB or the indication of ciphering for the SIB, or a combination thereof; and
determining whether to receive the SIB based, at least in part, on the scheduling information.

21. A user equipment (UE) for using broadcast location assistance data in a network, comprising:
a wireless transceiver; and
one or more processors configured to:
send a request via the wireless transceiver for ciphering key parameters in response to expiration of a time of applicability of ciphering key information or the UE leaving a geographic area of applicability of the ciphering key information or receipt, by the UE, of ciphered positioning assistance data for which the UE lacks corresponding ciphering key information;
obtain first ciphering key parameters received at the wireless transceiver from a network node in the network during a mobility management procedure;
obtain a System Information Block (SIB) periodically broadcast from a base station within at least one cell for the base station received at the wireless transceiver, the SIB comprising ciphered and encoded first positioning assistance data for the at least one cell for the base station, and an indication of ciphering;
decipher the encoded first positioning assistance data based, at least in part, on the first ciphering key parameters and the indication of ciphering;
decode the deciphered and encoded first positioning assistance data; and
determine location information for the UE based, at least in part, on the deciphered and decoded first positioning assistance data.

22. The UE of claim 21, wherein the base station comprises a New Radio (NR) NodeB (gNB) for 3GPP NR, or a next generation eNB (ng-eNB) for a Next Generation Radio Access Network (NG-RAN).

23. The UE of claim 22, wherein the first positioning assistance data comprises positioning assistance data for at least one position method.

24. The UE of claim 23, wherein the at least one position method comprises a position method supported by an NR Positioning Protocol (NPP) or by message types defined by Radio Technical Commission for Maritime Services (RTCM).

25. The UE of claim 24, wherein encoding of positioning assistance data is based on encoding for LPP, encoding for NPP or encoding for RTCM message types.

26. The UE of claim 24, wherein the at least one position method comprises UE-assisted OTDOA for NR, UE-based OTDOA for NR, UE-Based Assisted Global Navigation Satellite System (A-GNSS), UE-Assisted A-GNSS, UE-Assisted Real Time Kinematics (RTK), UE-Based RTK, UE Assisted Precise Point Positioning (PPP) or UE Based PPP or combination thereof.

27. The UE of claim 23, wherein the location information comprises location measurements for the at least one position method or a location estimate for the UE based on the at least one position method, or a combination thereof.

28. The UE of claim 21, wherein the network node comprises a Mobility Management Entity (MME) or an Access and Mobility Management Function (AMF) and wherein receiving the first ciphering key parameters from the Mobility Management Entity (MME) or the Access and Mobility Management Function (AMF) comprises receiving the first ciphering key parameters using the Mobility Management (MM) procedure.

29. The UE of claim 28, wherein the Mobility Management procedure comprises an Attach procedure, a Tracking Area Update procedure, a Service Request procedure or a Registration procedure.

30. The UE of claim 21, wherein the first ciphering key parameters comprise a ciphering key value, a ciphering key identifier, a time of applicability, an indication of the SIB or an indication of a geographic area of applicability, or a combination thereof.

31. The UE of claim 30, wherein the time of applicability comprises a start time, an end time or a duration, or a combination thereof.

32. The UE of claim 30, wherein the geographic area of applicability comprises the at least one cell for the base station, at least one location area for the network, at least one tracking area for the network, or at least one geographic area defined using coordinates.

33. The UE of claim 30, wherein the indication of ciphering comprises the ciphering key identifier.

34. The UE of claim 21, wherein the one or more processors are further configured to:
obtain second positioning assistance data ciphered and encoded in the SIB received at the wireless transceiver from the base station, wherein the second positioning assistance data is different from the first positioning assistance data;
decipher and decode the second positioning assistance data;
cease application of the first positioning assistance data; and
obtain the location information for the UE based, at least in part, on the deciphered and decoded second positioning assistance data.

35. The UE of claim 21, wherein the at least one cell for the base station comprises a serving cell for the UE.

36. The UE of claim 21, wherein the SIB periodically broadcast from the base station is segmented according to a segmentation option.

37. The UE of claim 36, wherein the segmentation option comprises octet string segmentation, and wherein the one or more processors are further configured to:
obtain all segments of the SIB periodically broadcast from the base station and received at the wireless transceiver; and
reassemble the SIB prior to the deciphering and the decoding.

38. The UE of claim 36, wherein the segmentation option comprises pseudo-segmentation with independent ciphering of each SIB segment, and wherein the one or more processors are further configured to:
obtain each segment of the SIB periodically broadcast from the base station and received at the wireless transceiver; and
decipher and decode each segment independently of other segments of the SIB.

39. The UE of claim 36, wherein the segmentation option comprises pseudo-segmentation with dependent ciphering of each SIB segment, and wherein the one or more processors are further configured to:
obtain each segment of the SIB periodically broadcast from the base station starting with a first segment and received at the wireless transceiver; and
decipher and decode each segment independently of later segments of the SIB.

40. The UE of claim 21, wherein the one or more processors are further configured to:
obtain scheduling information periodically broadcast from the base station and received at the wireless transceiver, wherein the scheduling information comprises a periodicity for the SIB, a content of the SIB or the indication of ciphering for the SIB, or a combination thereof; and
determine whether to receive the SIB based, at least in part, on the scheduling information.

41. A non-transitory storage medium comprising computer readable instructions stored thereon which are executable by one or more processors at a user equipment (UE) to:
request ciphering key parameters in response to expiration of a time of applicability of ciphering key information or the UE leaving a geographic area of applicability of the ciphering key information or receipt, by the UE, of ciphered positioning assistance data for which the UE lacks corresponding ciphering key information;
receive, at the UE, ciphering key parameters from a network node in a network during a mobility management procedure;
receive, at the UE, a System Information Block (SIB) periodically broadcast from a base station within at least one cell for the base station, the SIB comprising ciphered and encoded positioning assistance data for the at least one cell for the base station, and an indication of ciphering;
decipher, at the UE, the encoded positioning assistance data based, at least in part, on the ciphering key parameters and the indication of ciphering;
decode, at the UE, the deciphered and encoded positioning assistance data; and
determining, at the UE, location information for the UE based, at least in part, on the deciphered and decoded positioning assistance data.

42. A user equipment (UE) for using broadcast location assistance data in a network, comprising:
means for requesting ciphering key parameters in response to expiration of a time of applicability of ciphering key information or the UE leaving a geographic area of applicability of the ciphering key information or receipt, by the UE, of ciphered positioning assistance data for which the UE lacks corresponding ciphering key information;
means for receiving, at the UE, first ciphering key parameters from a network node in the network during a mobility management procedure;
means for receiving, at the UE, a System Information Block (SIB) periodically broadcast from a base station within at least one cell for the base station, the SIB comprising ciphered and encoded first positioning assistance data for the at least one cell for the base station, and an indication of ciphering;
means for deciphering, at the UE, the encoded first positioning assistance data based, at least in part, on the first ciphering key parameters and the indication of ciphering;
means for decoding, at the UE, the deciphered and encoded first positioning assistance data; and
means for determining, at the UE, location information for the UE based, at least in part, on the deciphered and decoded first positioning assistance data.

* * * * *